(12) United States Patent
Robert Safavi et al.

(10) Patent No.: US 10,771,186 B2
(45) Date of Patent: Sep. 8, 2020

(54) TRANSMITTING DEVICE, RECEIVING DEVICE AND METHODS THEREOF

(71) Applicant: Huawei Technologies Co., Ltd., Shenzhen (CN)

(72) Inventors: Anahid Robert Safavi, Kista (SE); Branislav M. Popovic, Kista (SE); Alberto Giuseppe Perotti, Segrate (IT)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/272,437

(22) Filed: Feb. 11, 2019

(65) Prior Publication Data

US 2019/0245646 A1 Aug. 8, 2019

Related U.S. Application Data

(63) Continuation of application No. PCT/EP2016/069304, filed on Aug. 12, 2016.

(51) Int. Cl.
*H04L 27/34* (2006.01)
*H04L 1/00* (2006.01)
(Continued)

(52) U.S. Cl.
CPC ............ *H04L 1/001* (2013.01); *H04J 11/004* (2013.01); *H04L 1/0047* (2013.01);
(Continued)

(58) Field of Classification Search
CPC ... H04L 1/001; H04L 27/3488; H04L 5/0082; H04L 1/0061; H04L 1/0047; H04L 5/0005; H04J 11/004
See application file for complete search history.

(56) References Cited

U.S. PATENT DOCUMENTS

2016/0112995 A1   4/2016 Chen
2017/0048841 A1*  2/2017 Hwang ............... H04L 5/0044
(Continued)

FOREIGN PATENT DOCUMENTS

CN   104426633 A   3/2015
CN   105530652 A   4/2016
(Continued)

OTHER PUBLICATIONS

Perotti et al., "Non-Orthogonal Multiple Access for DegradedBroadcast Channels: RA-CEMA," 2015 IEEE Wireless Communications and Networking Conference (WCNC 2015)—Track 1: PHY and Fundamentals, pp. 1-6, Institute of Electrical and Electronics Engineers—New York, New York (2015).
(Continued)

*Primary Examiner* — Thai Nguyen
(74) *Attorney, Agent, or Firm* — Leydig, Voit & Mayer, Ltd.

(57) ABSTRACT

The embodiments of the present invention relates to a transmitting device and to a receiving device. The transmitting device has a processor to obtain a first sequence of bits comprising first control information addressed for at least one receiving device, obtain a second sequence of bits comprising first data information addressed for the at least one receiving device, superpose the first sequence of bits and the second sequence of bits into a first superposed sequence of symbols; a transmitter to transmit the first superposed sequence of symbols in a radio resource. The receiving device has a receiver to receive a first superposed sequence of symbols comprising: a first sequence of bits comprising first control information and a second sequence of bits comprising first data information; a processor to decode the first superposed sequence of symbols so as to obtain the first sequence of bits.

12 Claims, 18 Drawing Sheets

(51) Int. Cl.
*H04J 11/00* (2006.01)
*H04L 5/00* (2006.01)

(52) U.S. Cl.
CPC .......... *H04L 1/0061* (2013.01); *H04L 5/0082* (2013.01); *H04L 27/3488* (2013.01); *H04L 5/0005* (2013.01)

(56) References Cited

U.S. PATENT DOCUMENTS

2018/0262288 A1* 9/2018 Gao .................... H04J 7/00
2019/0182096 A1* 6/2019 Bin Sediq ............. H04L 1/0004

FOREIGN PATENT DOCUMENTS

| WO | 2006105471 A1 | 10/2006 |
| WO | 2007108658 A1 | 9/2007 |
| WO | 2015000917 A2 | 1/2015 |
| WO | 2017046633 A1 | 3/2017 |

OTHER PUBLICATIONS

"3rd Generation Partnership Project; Technical Specification Group Radio Access Network; Evolved Universal Terrestrial Radio Access (E-UTRA); Multiplexing and channel coding(Release 13)," 3GPP TS 36.212 V13.2.0, pp. 1-140, 3rd Generation Partnership Project—Valbonne, France (Jun. 2016).

3rd Generation Partnership Project; Technical Specification Group Radio Access Network; Study on Downlink Multiuser Superposition Transmission (MUST) for LTE(Release 13), 3GPP TR 36.859 V13.0.0, pp. 1-48, 3rd Generation Partnership Project—Valbonne, France (Dec. 2015).

TSE et al., "Fundamentals of Wireless Communications," pp. 1-647, Cambridge University Press (2005).

"3rd Generation Partnership Project; echnical Specification Group Radio Access Network; Evolved Universal Terrestrial Radio Access (E-UTRA); Physical layer procedures (Release 13)," pp. 1-381, 3rd Generation Partnership Project—Valbonne, France (Jun. 2016).

* cited by examiner

TRANSMITTING DEVICE, RECEIVING DEVICE AND METHODS THEREOF

CROSS-REFERENCE TO RELATED APPLICATIONS

This application is a continuation of International Application No. PCT/EP2016/069304, filed on Aug. 12, 2016, the disclosure of which is hereby incorporated by reference in its entirety.

TECHNICAL FIELD

The disclosure relates to a transmitting device and a receiving device. Furthermore, the disclosure also relates to corresponding methods, a computer program, and a computer program product.

BACKGROUND

In long term evolution (LTE) and in most wireless systems, data transmissions and control transmissions are designed to loan different dedicated physical channels. These transmissions are independently designed and optimized separately. Data and control channels are transmitted orthogonal to each other to guarantee the reception of control information and data decoding with a reasonable error rate. Two different types of control channels co-exist in current LTE standards and are called physical downlink control channel (PDCCH) and enhanced physical downlink control channel (ePDCCH).

In the case of PDCCH transmission, data is always transmitted (scheduled) posterior to transmission of corresponding control channel information. In LTE, control channel information is transmitted in the first N (up to four) symbols in the beginning of a transmission time interval (TTI) containing 14 OFDM symbols. In this context, the corresponding data is scheduled in the current TTI. Using this method, a user equipment (UE) that is not receiving control channel in the beginning of a sub-frame does not use additional power to detect a possible control channel during the remaining slots of the sub-frame. Therefore, the power consumption remains controlled. For ePDCCH, control information is scheduled over a TTI as data packets. In this case and contrary to PDCCH, the UE will first decode the control channel and thereafter the related data on the same TTI.

The control channel of a UE contains information about incoming data for that UE such as: resource indication for data transmission, transport format, hybrid automatic repeat request (HARD) information, information related to spatial multiplexing if applicable, and power control commands of the corresponding data transmission. This information is encoded using a certain number of predefined formats. Different transmission formats (a total of 5) are a-priori unknown to the UE and each UE will find its own control information by blindly decoding the incoming information, i.e., by trying a set of possible formats.

Different transmission formats are called DCI (Downlink Control Information) formats in LTE. Each PDCCH or ePDCCH carries one DCI and is identified by a Radio Network Temporary Identifier (RNTI). Prior to transmission, a UE-specific cyclic redundancy check (CRC) word is appended to each control message that is scrambled by different kinds of RNTI. The attached CRC word is used by the UE to find the control information. After attaching the CRC word, the control information bits are encoded with a rate ⅓ tail-biting convolutional code and the code rate is matched to fit the amount of resource available for PDCCH transmission (specification 36.212). The mapping of control channel to physical resource elements (RE) is performed in units called control channel elements (CCE). Each CCE consists of 36 REs. Several aggregation levels of CCEs may be used for the transmission of control information. Therefore, the UE blindly detects the control channel information by testing all possible CCE combinations. This blind decoding is done in a search space using different possible candidate locations defined in standard. After each blind decoding, the UE checks the CRC with corresponding RNTI. If it succeeds, the UE can derive the exact DCI format of the PDCCH from the payload size and RNTI. The starting point for the search space is implicitly defined as a function of UE RNTI and an aggregation level. For the case of ePDCCH, the eNB will semi-statically configure several PRB pairs for ePDCCH transmission. Inside this region CCE are blindly decoded starting from the implicit indication of the search space.

The new generation of radio air interface of 5G (NR) is going to support much more demanding requirements than LTE, e.g., for spectral efficiency and latency tailored to a multitude of defined different scenarios such as enhanced Mobile BroadBand (eMBB), massive Machine Type Communication (mMTC) and Ultra-Reliable and Low Latency Communications (URLLC). In order to ensure a configurable framework to support a wide range of defined services while keeping the integration of new services possible, different configurable numerologies for different applications should be defined. By different numerologies in this disclosure we mean different subcarrier spacing, different cyclic prefix length and different TTI lengths.

In the mentioned conventional solution, control information (PDCCH/ePDCCH) and data information (PDSCH) are transmitted orthogonally over the air interface. In this case, the UE first decodes its own control channel. If decoding of control channel is successful, the UE can proceed with decoding of data. When data and control information are transmitted orthogonally as in the conventional solution, there is an inherent overhead related to control channel. By overhead we mean additional resources that are exclusively allocated to transmit control channel information. This overhead becomes considerable compared to legacy system, specifically when TTI becomes small and the bandwidth remains unchanged or when the bandwidth it is shortened. Consequently, the overhead and transmission processing time corresponding to the control channel is non-negligible compared to the overhead and transmission time dedicated to data channel. Moreover, orthogonal allocation of control and data is less flexible in the context of NR where different numerologies are supposed to co-exist each fitted to a specific scenario.

SUMMARY

An objective of embodiments of the disclosure is to provide a solution which mitigates or solves the drawbacks and problems of conventional solutions.

Another objective of embodiments of the disclosure is to provide a solution resulting in reduced overhead compared to conventional solutions.

An "or" in this description and the corresponding claims is to be understood as a mathematical OR which covers "and" and "or", and is not to be understand as an XOR (exclusive OR).

The indefinite article "a" in this disclosure and claims is not limited to "one" and can also be understood as "one or more", i.e., plural.

The above objectives are solved by the subject matter of the independent claims. Further advantageous implementation forms of the embodiments of the present invention can be found in the dependent claims.

According to a first aspect of the disclosure, the above mentioned and other objectives are achieved with a transmitting device for a wireless communication system, the transmitting device comprising:

a processor configured to:

obtain a first sequence of bits comprising first control information addressed for at least one receiving device;

obtain a second sequence of bits comprising first data information addressed for the at least one receiving device;

superpose the first sequence of bits and the second sequence of bits into a first superposed sequence of symbols;

a transmitter configured to:

transmit the first superposed sequence of symbols to the at least one receiving device in a radio resource.

The objective of reduced overhead is achieved by superposition of data information and control information and transmitting the superposed sequence to at least one receiving device. In this way resources allocated to control information can be used to carry data information as well. The additional benefit of the first aspect is to reduce transmission processing time compared to the case where data information and control information are transmitted orthogonally over different time-frequency resources. Further, the benefits achieved are considerable, especially when the TTI becomes small and the transmission bandwidth remains unchanged or is narrowed. In this case, the amount of control channel information compared to data channel information becomes considerable. Consequently, the overhead and transmission processing time corresponding to the control channel is non-negligible compared to the overhead and transmission time dedicated to data channel.

It is common understanding that the new radio (NR) specification should support different applications with different numerologies. Different numerologies might need different size of control channel that should be pre-allocated separately from data channel if orthogonal transmission of control channel is performed. The present solution is more flexible in the sense that, pre-allocation of control channel region is not needed as control information and data information are superposed.

In a first possible implementation form of a transmitting device according to the first aspect, the transmitter is configured to:

transmit the first superposed sequence of symbols in the beginning of a transmission time interval of the radio resource.

Superposed sequence of symbols is transmitted in time over a transmission time interval (TTI) that contains several time units. Beginning of the TTI denoted by t=0 herein consists of the first time unit that contains the first superposed symbol to be transmitted over the air assuming that each symbol is mapped to one time unit.

The first implementation form has the advantage of reducing the processing time to decode control information and consequently data information and reducing the size of buffer that is needed to collect data that is received prior to decoding of control. Indeed, as the control information has to be decoded correctly before data information to enable data decoding, transmitting control information in the beginning of TTI helps to reduce reception processing time and the size of potential buffer that is needed to collect data information prior to complete decoding of control information.

In a second possible implementation form of a transmitting device according to the first implementation form of the first aspect or to the first aspect as such, the first control information and the first data information are addressed for a first receiving device. It is a common understanding that the NR should support multiple numerologies suitable for different requirements. In order to make this support feasible and flexible, it is desired that all information needed to be detected and decoded by one receiving device is contained within the transmission to that transmitting device itself. Superposition of control information and data information transmitted from one transmitting device and addressed to one receiving device can fulfil this objective in a flexible manner without allocating exclusive resources to the control channel.

More precisely, all information needed to detect and decode data and control information intended for one receiving device (including scheduling assignment) is contained within the transmission corresponding to the receiving device itself. This has particular importance when the system is designed to support different TTI lengths corresponding to different delay requirements in NR.

Another advantage of the second possible implementation form is that the transmission processing time to send data and control channel is further reduced as compared to the case where data and control are transmitted separately as the transmission of control information and data information for the same user happens only over one TTI. This advantage becomes important in the case of transmissions with low latency.

Yet another advantage of this scheme is that, legacy control channel structure in this scheme could be re-used as well. The receiving device can obtain the knowledge of composite constellation blindly and consequently gain knowledge of the control constellation as described in the present disclosure.

Moreover, if needed, legacy control channel fields could be reduced for this scheme by a new design. For instance, the actual modulation and coding scheme (MCS) of data channel could be derived once decoding of control channel is performed successfully. Resource block allocation indication in the field of data could be removed as long as data information and control information have the same resource block allocation. Obviously, this needs a new control channel design compared to that for the legacy system.

In a third possible implementation form of a transmitting device according to the first implementation form of the first aspect or to the first aspect as such, the first control information is addressed for a first receiving device and the first data information is addressed for a second receiving device.

The third implementation form—when at least two different users are superposed in one time-frequency-space resources—can be adopted with very little or almost no change to the existing standard frame formats. For example, for the case of LTE, the existing field of enhanced control channel—ePDCCH—could be reused with minimum change. Indeed, when ePDCCH is used, control channel is scheduled within data resources. Here, for this implementation, the same control channel could be re-used by indicating the starting resource allocation of control channel being the same as the starting resource allocation of data information.

In a fourth possible implementation form of a transmitting device according to any of the preceding implementation forms of the first aspect, the processor is configured to:

superpose the first sequence of bits and the second sequence of bits into the first superposed sequence of symbols based on rate-adaptive constellation expansion multiple access, wherein at least one bit assigned for the first sequence of bits has a higher bit level capacity compared to at least one bit assigned for the second sequence of bits.

The fourth implementation form has the advantage of having a freedom for allocation of control channel bits to the bits in the composite constellation that have different levels of bit level capacity i.e. mid-level, high-level or low-level capacity. This freedom in allocation of control channel bits in the composite constellation helps to trade-off the quality of control channel and data channel detection and having reasonable decoding performance for data information despite the interference generated when superposition is used.

In a fifth possible implementation form of a transmitting device according to any of the preceding implementation forms of the first aspect, the processor is configured to:

superpose the first sequence of bits and the second sequence of bits into the first superposed sequence of symbols based on a non-orthogonal multiple access, NOMA, wherein the most significant bits in the labels of the composite constellation of the NOMA scheme are assigned for the first sequence of bits.

Here, the composite constellation can be a set of complex signals $\{s_1, \ldots, s_M\}$ after superposition in any of the non-orthogonal multiple access schemes. Each complex signal has an associated m-bit label where $m=\log_2 (M)$ each signal has a different label. The modulator receives in its input a sequence of bits of arbitrary length, divides the sequence in groups of m bits and, for each m-bit group, the modulator selects for transmission the composite constellation signal whose label is equal to the m-bit group.

The most significant bits in the labels of the composite constellation refer to the bits that come first when reading the label left to right.

The fifth implementation form is advantageous as similar overloading schemes exist in the current standards and therefore the effort required for standardization would be reduced.

In a sixth possible implementation form of a transmitting device according to any of the preceding implementation forms of the first aspect, a code rate for the first sequence of bits is lower than a code rate for the second sequence of bits.

The sixth implementation form has the advantage of transmitting control channel with lower rate and thereby obtaining a more robust control channel code to channel impairments.

According to a second aspect of the disclosure, the above mentioned and other objectives are achieved with a receiving device for a wireless communication system, the receiving device comprising:

a receiver configured to:

receive a first superposed sequence of symbols comprising: a first sequence of bits comprising first control information and a second sequence of bits comprising first data information;

a processor configured to:

decode the first superposed sequence of symbols so as to obtain the first sequence of bits, wherein the first sequence of bits comprises the first control information.

The receiving device according to the second aspect has a number of advantages. Reduced overhead is achieved by superposition of data information and control information and receiving the superposed sequence. In this way resources allocated to control information can be used to carry data information as well. The additional benefit of the second aspect is to reduce transmission processing time compared to the case where data information and control information are transmitted orthogonally over different time-frequency resources. Further, the benefits achieved are considerable, especially when the TTI becomes small and the transmission bandwidth remains unchanged or is narrowed. In this case, the amount of control channel information compared to data channel information becomes considerable. Consequently, the overhead and transmission processing time corresponding to the control channel is non-negligible compared to the overhead and transmission time dedicated to data channel.

As aforementioned, it is common understanding that the NR specification should support different applications with different numerologies. Different numerologies might need different size of control channel that should be pre-allocated separately from data channel if orthogonal transmission of control channel is performed. The present solution is more flexible in the sense that, pre-allocation of control channel region is not needed as control information and data information are superposed.

In a first possible implementation form of a receiving device according to the second aspect, the processor is configured to:

cancel interference in the first superposed sequence of symbols based on the first sequence of bits so as to obtain a first interference cancelled superposed sequence of symbols;

decode the first interference cancelled superposed sequence of symbols based on the first control information so as to obtain the second sequence of bits comprising the first data information.

The first implementation form has the advantages as the transmitting device according to the second implementation form of the first aspect.

In a second possible implementation form of a receiving device according to the second aspect, the receiver is configured to:

receive a second superposed sequence of symbols from the transmitting device, the second superposed sequence of symbols comprising a third sequence of bits comprising second control information and a fourth sequence of bits comprising second data information; wherein the processor is configured to:

cancel interference in the second superposed sequence of symbols based on the third sequence of bits so as to obtain a second interference cancelled superposed sequence of symbols;

decode the second interference cancelled superposed sequence of symbols based on the first control information so as to obtain the fourth sequence of bits comprising the second data information.

According to a third aspect of the disclosure, the above mentioned and other objectives are achieved with a wireless communication system comprising a transmitting device according to the first aspect and at least one receiving device according to the second aspect.

According to a fourth aspect of the disclosure, the above mentioned and other objectives are achieved with a method for a transmitting device, the method comprising:

obtaining a first sequence of bits comprising first control information addressed for at least one receiving device;

obtaining a second sequence of bits comprising first data information addressed for the at least one receiving device;

superposing the first sequence of bits and the second sequence of bits into a first superposed sequence of symbols;

transmitting the first superposed sequence of symbols to the at least one receiving device in a radio resource.

In a first possible implementation form of a method according to the fourth aspect, the method comprises:

transmitting the first superposed sequence of symbols in the beginning of a transmission time interval of the radio resource.

In a second possible implementation form of a method according to the first implementation form of the fourth aspect or to the fourth aspect as such, the first control information and the first data information are addressed for a first receiving device.

In a third possible implementation form of a method according to the first implementation form of the fourth aspect or to the fourth aspect as such, the first control information is addressed for a first receiving device and the first data information is addressed for a second receiving device.

In a fourth possible implementation form of a method according to any of the preceding implementation forms of the fourth aspect, the method comprises:

superposing the first sequence of bits and the second sequence of bits into the first superposed sequence of symbols based on rate-adaptive constellation expansion multiple access, wherein at least one bit assigned for the first sequence of bits has a higher bit level capacity compared to at least one bit assigned for the second sequence of bits.

In a fifth possible implementation form of a method according to any of the preceding implementation forms of the fourth aspect, the method comprises:

superposing the first sequence of bits and the second sequence of bits into the first superposed sequence of symbols based on a non-orthogonal multiple access, NOMA, wherein the most significant bits in the labels of the composite constellation are assigned for the first sequence of bits.

In a sixth possible implementation form of a method according to any of the preceding implementation forms of the fourth aspect, a code rate for the first sequence of bits is lower than a code rate for the second sequence of bits.

According to a fifth aspect of the disclosure, the above mentioned and other objectives are achieved with a method for a receiving device, the method comprising:

receiving a first superposed sequence of symbols comprising: a first sequence of bits comprising first control information and a second sequence of bits comprising first data information;

decoding the first superposed sequence of symbols so as to obtain the first sequence of bits, wherein the first sequence of bits comprises the first control information.

In a first possible implementation form of a method according to the fifth aspect, the method comprises:

cancelling interference in the first superposed sequence of symbols based on the first sequence of bits so as to obtain a first interference cancelled superposed sequence of symbols;

decoding the first interference cancelled superposed sequence of symbols based on the first control information so as to obtain the second sequence of bits comprising the first data information.

In a second possible implementation form of a method according to the fifth aspect, the method comprises:

receiving a second superposed sequence of symbols from the transmitting device, the second superposed sequence of symbols comprising a third sequence of bits comprising second control information and a fourth sequence of bits comprising second data information; wherein the processor is configured to:

cancelling interference in the second superposed sequence of symbols based on the third sequence of bits so as to obtain a second interference cancelled superposed sequence of symbols;

decoding the second interference cancelled superposed sequence of symbols based on the first control information so as to obtain the fourth sequence of bits comprising the second data information.

The advantages of a method according to the fourth aspect or the fifth aspect are the same as the corresponding transmitting device according to the first aspect or the corresponding receiving device according to the second aspect. Embodiments of the embodiments of the present invention also relates to a computer program, characterized in code means, which when run by processing means causes said processing means to execute any method according to the embodiments of the present invention. Further, embodiments of the invention also relate to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the present invention will be apparent from the following detailed description.

BRIEF DESCRIPTION OF THE DRAWINGS

The appended drawings are intended to clarify and explain different embodiments of the embodiments of the present invention, in which.

DETAILED DESCRIPTION

Figure 1:
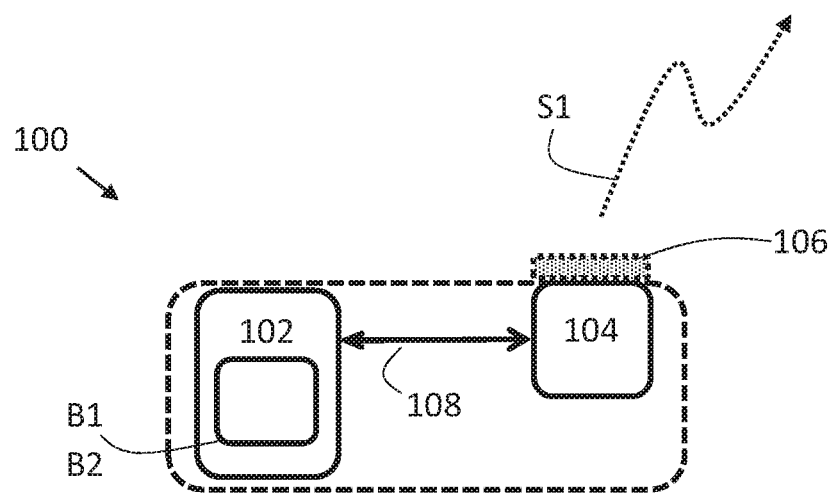
FIG. 1 shows a transmitting device according to an embodiment of the disclosure.

FIG. 1 shows a transmitting device 100 according to an embodiment of the disclosure. The transmitting device 100 in FIG. 1 comprises a processor 102 coupled to a transmitter 104 with communication means 108. The transmitter 104 is further coupled to an antenna 106 configured for wireless communications in a wireless communication system.

According to the disclosure, the processor 102 is configured to obtain a first sequence of bits B1 comprising first control information C1 addressed for at least one receiving device 300 and a second sequence of bits B2 comprising first data information D1 addressed for the at least one receiving device 300. The processor 102 is configured to superpose the first sequence of bits B1 and the second sequence of bits B2 into a first superposed sequence of symbols S1. The transmitter 104 is configured to transmit the first superposed sequence of symbols S1 to the at least one receiving device 300 (see FIGS. 5 and 12) in a radio resource.

Figure 2:
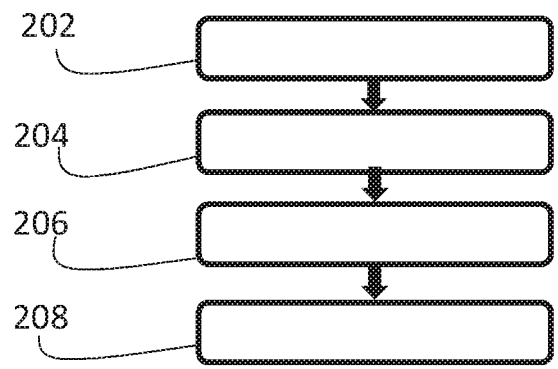
FIG. 2 shows a flow chart of a method according to an embodiment of the disclosure.

FIG. 2 shows a method according to an embodiment of the disclosure which may be executed in a transmitting device 100, such as the one shown in FIG. 1. The method 200 comprises obtaining 202 a first sequence of bits B1 comprising first control information C1 addressed for at least one receiving device 300. The method 200 further comprises obtaining 204 a second sequence of bits B2 comprising first data information D1 addressed for the at least one receiving device 300. The method 200 further comprises superposing 206 the first sequence of bits B1 and the second sequence of bits B2 into a first superposed sequence of symbols S1. The method 200 further comprises transmitting 208 the first superposed sequence of symbols S1 to the at least one receiving device 300 in a radio resource.

The transmitting device 100 may be part of or fully integrated in a radio network node, such as a base station. A (radio) network node or a base station, e.g. a Radio Base Station (RBS), which in some networks may be referred to as transmitter, "eNB", "eNodeB", "NodeB" or "B node", depending on the technology and terminology used. The network nodes may be of different classes such as e.g. macro eNodeB, home eNodeB or pico base station, based on transmission power and thereby also cell size. The network node can be a Station (STA), which is any device that contains an IEEE 802.11-conformant Media Access Control (MAC) and Physical Layer (PHY) interface to the Wireless Medium (WM).

Figure 3:
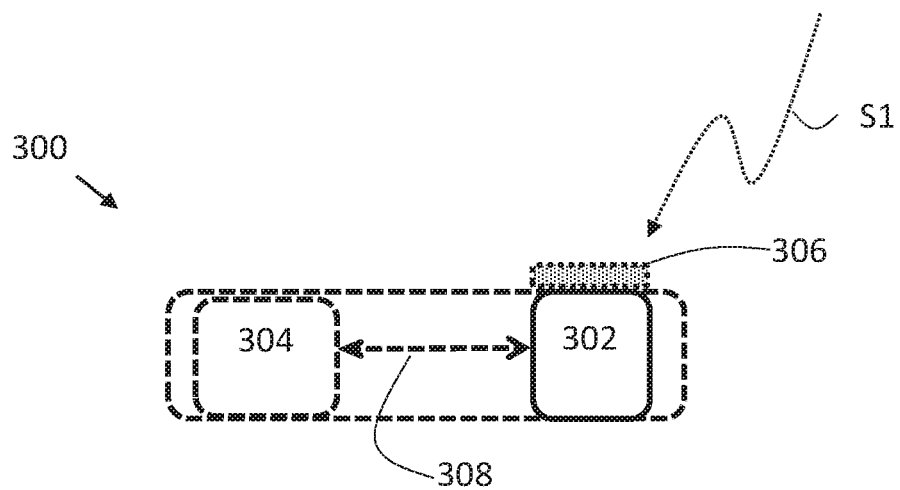
FIG. 3 shows a receiving device according to an embodiment of the disclosure.

FIG. 3 shows a receiving device 300 according to an embodiment of the disclosure. The receiving device 300 in FIG. 3 comprises a processor 304 coupled to a receiver 302 with communication means 308. The receiver 302 is further coupled to an antenna 306 configured for wireless communications in a wireless communication system.

According to the disclosure, the receiver 302 is configured to receive a first superposed sequence of symbols S1 comprising: a first sequence of bits B1 comprising first control information C1 and a second sequence of bits B2 comprising first data information D1. The first superposed sequence of symbols S1 may be received from a transmitting device 100 such as the one shown in FIG. 1. The processor 304 is configured to decode the first superposed sequence of symbols S1 so as to obtain the first sequence of bits B1, wherein the first sequence of bits B1 comprises the first control information C1.

Figure 4:
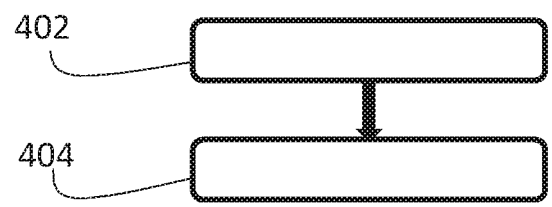
FIG. 4 shows a flow chart of a method according to an embodiment of the disclosure.

FIG. 4 shows a method 400 according to an embodiment of the disclosure which may be executed in a receiving device 300, such as the one shown in FIG. 1. The method 400 comprises receiving 402 a first superposed sequence of symbols S1 comprising: a first sequence of bits B1 comprising first control information C1 and a second sequence of bits B2 comprising first data information D1. The method 400 further comprises decoding 404 the first superposed sequence of symbols S1 so as to obtain the first sequence of bits B1, wherein the first sequence of bits B1 comprises the first control information C1.

The receiving device 300 may be part of or fully integrated in a user device such as a UE. A user device 800, a UE, a mobile station, or wireless terminal and/or mobile terminal is enabled to communicate wirelessly in a wireless communication system, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM).

Furthermore, superposition (coding) or overloading is a technique that enables simultaneous transmission of more than one data stream (such as PDSCH) to co-scheduled users. According to the basic superposition coding principle, the codewords of two users with different received signal to noise ratios (SNRs) are independently mapped to the symbols of user constellations, also called component constellations and modulated. The modulated signals of the two users are then linearly superposed. The resulting sequence of symbols is drawn from a larger constellation which is also called composite constellation. According to the theory of superposition coding, in order to observe rate gains, the received SNRs of the superposed users must be different. Here and in the rest of this disclosure, the received SNR of each user is the ratio of the signal energy $E_S$ of the composite constellation to the one-sided power spectral density of noise $N_0$: $SNR=E_S/N_0$. However, other definitions for SNR can obviously be used.

Different categories of overloading schemes are known in the art, such as non-orthogonal multiple access (NOMA), semi orthogonal multiple access (SOMA), rate-adaptive constellation expansion multiple access (RA-CEMA, also known as REMA) and constellation expansion multiple access (CEMA). In NOMA, (coded) bits of two or more co-scheduled users are independently mapped to the component constellation symbols that are superposed with adaptive power ratio. In SOMA, (coded) bits of two or more users are jointly mapped to the component constellations that are superposed with adaptive power ratio. In CEMA and in RA-CEMA (a.k.a. REMA), coded bits in the code words of two or more co-scheduled users are directly superposed onto the symbols of a composite constellation. The assignment of label bits to users is done on the composite constellation, therefore one has the freedom of assigning label bits with different bit level capacities to different users. RA-CEMA is CEMA with channel coding where the channel code rates of the multiplexed UEs are adaptively changed based on the bit-level capacities and SINR.

Hence, in the present disclosure the meaning of superposing the first sequence of bits B1 and the second sequence of bits B2 into a first superposed sequence of symbols S1 may mean that sequence of bits B1 and sequence of bits B2 are mapped independently or jointly into component constellation symbols that are further superposed using e.g. NOMA or SOMA with possibly different power ratios to obtain overloaded or superposed sequence of symbols S1.

When REMA or RA-CEMA is used, the first sequence of bits B1 and the second sequence of bits B2 are directly superposed onto a sequence of symbols of an arbitrary composite constellation S1. In REMA, the composite constellation is selected from a library of available constellations which may include the constellations obtained by linear superposition with or without Gray mapping as those used in SOMA and NOMA.

Furthermore, we distinguish between control information and data information intended for the same or different receiving devices. Hereinafter, a receiving device 300 first recovers control information and then, based on the obtained control information, recovers its data information. Receiving device 300 is denoted as a control receiving device when it performs retrieval of control information and is denoted as a data receiving device when it performs retrieval of its data information. The control information and the data information for the receiver device 300 may be transmitted in the same superposed signal, thereby control information and data information in a same superposed signal are intended for the same receiving device. Alternatively, the control information and the data information for the receiver device 300 may be transmitted in different superposed signals, thereby control information and data information in a same superposed signal are intended for different receiving devices.

The control information may in a LTE systems be transmitted using control channel called PDCCH/ePDCCH and the data information may be transmitted using data channel called PDSCH.

The receiving device 300 is configured to receive a first sequence of superposed symbols S1 from transmitting device 100, the processor 304 of the receiving device 300 is configured to cancel interference in the first superposed sequence of symbols S1 based on the first sequence of bits B1 so as to obtain a first interference cancelled superposed sequence of symbols S1'. The processor 304 is further configured to decode the first interference cancelled superposed sequence of symbols S1' based on the first control information C1 so as to obtain the second sequence of bits B2 comprising the first data information D1.

The receiving device 300 is configured to receive a first superposed sequence of symbols S1 and a second superposed sequence of symbols S2 from the transmitting device 100, the second superposed sequence of symbols S2 comprises a third sequence of bits B3 comprising second control information C2 and a fourth sequence of bits B4 comprising second data information D2. The processor 304 of the receiving device 300 is in this case configured to cancel interference in the second superposed sequence of symbols S2 based on the third sequence of bits B3 so as to obtain a second interference cancelled superposed sequence of symbols S2'. The processor 304 is further configured to decode the second interference cancelled superposed sequence of symbols S2' based on the first control information C1 so as to obtain the fourth sequence of bits B4 comprising the second data information D2.

Figure 5:
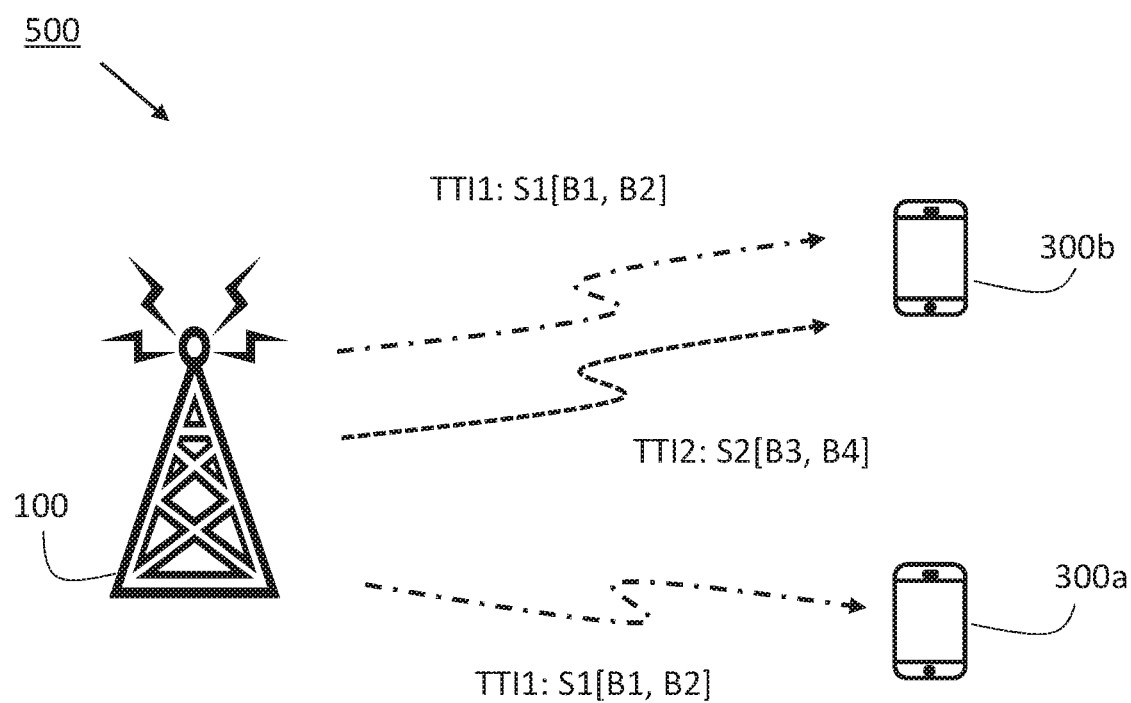
FIG. 5 shows an example when control information and data information are addressed for two different receiving devices.

FIG. 5 shows an embodiment of the disclosure in which the present superposition transmissions involves at least two different receiving devices, i.e. 300a and 300b. The first control information C1 is addressed for a first receiving device 300a and the first data information D1 is addressed for a second receiving device 300b. The transmitting device 100 transmits a first superposed sequence of symbols S1 in TTI1 in a wireless communication system 500. The first superposed sequence of symbols S1 comprises a first sequence of bits B1 comprising first control information C1 addressed for 300a and second sequence of bits B2 comprising first data information D1 not addressed for 300a. The transmitting device 100 further transmits a second superposed sequence of symbols S2 in TTI2. The second superposed sequence of symbols S2 comprises a third sequence of bits B3 comprising second control information C2 not addressed for 300a and a fourth sequence of bits B4 comprising second data information D2 addressed for 300a.

In this case, control information and data information for the at least two different receiving devices 300a, 300b as shown in FIG. 5 are superimposed and transmitted in consecutive TTIs. Data information of a specific receiving device 300 is transmitted after sending its control information, for instance in the following TTI. At the receiving device 300, reception of data information is successful if and only if its control information and data information are both correctly decoded.

In one embodiment, the first superposed sequence of symbols S1 is transmitted in the beginning of the TTI, e.g. at t=0 for the TTI. More generally, all superposed sequences of symbols are transmitted in the beginning of the TTI according to this embodiment.

Figure 6:
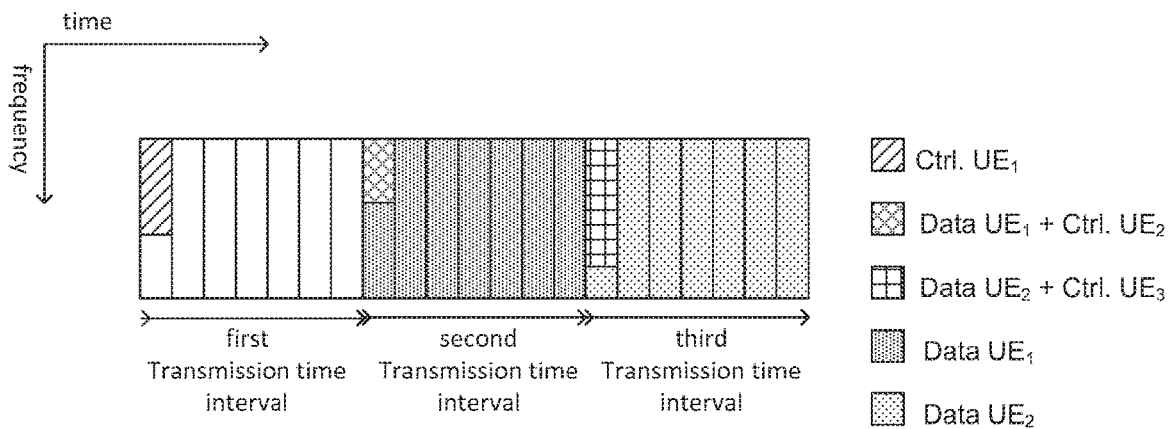
FIG. 6 shows a frame structure when data information and control information of at least two receiving devices are superposed in one TTI.

In one further embodiment, it is assumed that control information and data information are superposed in one TTI following a predefined ordering. One example of this setup is shown in FIG. 6, where the ordering is determined by the UE indices in this particular example, namely: UE1, then UE2, ..., then UE3. etc. In one case, the ordering could be based on the received SNR of the UE, where UE1 has higher SNR than UE2, UE2 has higher SNR than UE3, ..., and UEU-1 has higher SNR than UEU, wherein U is an arbitrary integer.

For example, in the second TTI in FIG. 6, for the overloaded portion of the second TTI, control information of UE2 is superposed on the data information of UE1. Upon reception of the second TTI containing the superposed signal, the receiving device of UE2 blindly decodes the corresponding control channel information treating the signal of UE1 as noise. More precisely, the receiving device of UE2 performs first demodulation, then channel decoding of control information of UE2. After channel decoding, a CRC check is performed to verify if the control information of UE2 is correctly decoded. At the same TTI, the receiving device of UE1 will receive the superposed signal containing control information of UE2 with data information of UE1. Then the receiving device of UE1 will demodulate and decode control information of UE2 from the superposed signal. Once this control information is obtained, it is used to cancel interference from the superposed received signal. Data information of UE1 is obtained after data decoding is performed over interference cancelled signal using control information of UE1 that was previously obtained. It is worth to mention that the decoding of data information of UE1 happens only if the control information of UE1 at the previous TTI was successfully decoded, thereby the control information related to data channel characteristics such as, carrier indicator, modulation order, new data indicator, etc., are known. In the following TTI, data information of UE2 is superposed to control information of UE3 and the procedure is further iterated until the last UE in the sequence is reached.

In FIG. 6 the blank portion of the first TTI corresponds to the data information of another UE (e.g. UE4). Indeed, for this scheme an additional TTI is needed to initialize the procedure. One advantage of this solution is that the average per-user overhead of control channel is reduced. FIG. 6 also shows the case where the control packet is smaller compared to the TTI.

Figure 7:
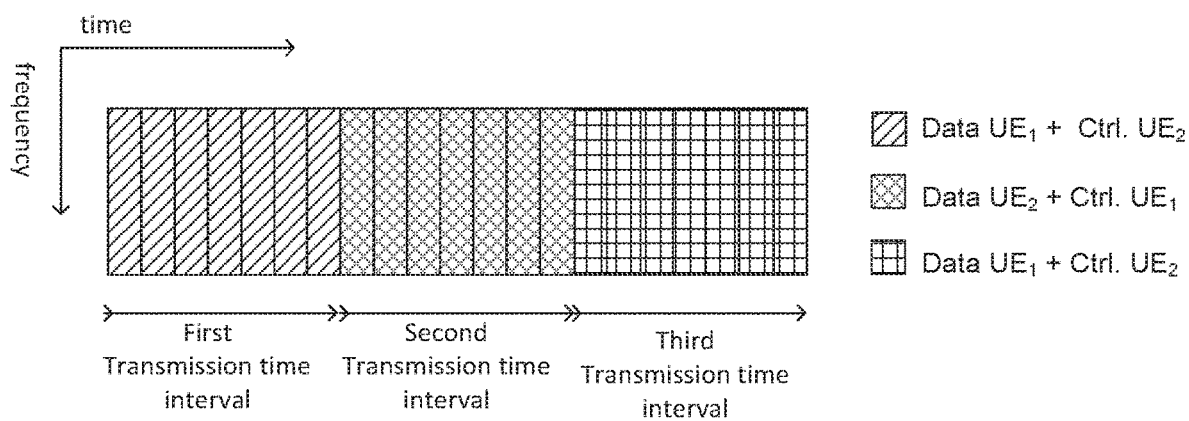
FIG. 7 shows superposition of data information and control information when a control packet has the same length as a data packet

One could also consider that control packet and data packet have the same length as the TTI as shown in FIG. 7. It is noted that FIG. 7 does not show the blank TTI shown in FIG. 6 without loss of generality. It is assumed that the control information of UE2 is superposed to the data information of UE1 in the first TTI shown in FIG. 7 over the whole first TTI. Upon reception of the first TTI containing the superposed signal, the receiving device of UE2 decodes blindly the corresponding control channel information treating the signal of UE1 as noise. More precisely, the receiving device of UE2 performs first demodulation, then channel decoding of control information of UE2. After channel decoding, a CRC check is performed to verify if control information of UE2 is correctly decoded. At the same TTI, the receiving device of UE1 will receive the superposed signal containing control information of UE2 with data information of UE1. Then the receiving device of UE1 will demodulate and decode control information of UE2 from the superposed signal. Once this information is obtained, it is used to cancel interference from the superposed received signal. Data information of UE1 is obtained after data decoding is performed over interference cancelled signal using control information of UE1 that was previously obtained. Obviously, this case is the worst case in terms of performance for data detection as the whole data packet is interfered by control signals, contrary to the case shown in FIG. 6.

Figure 8:
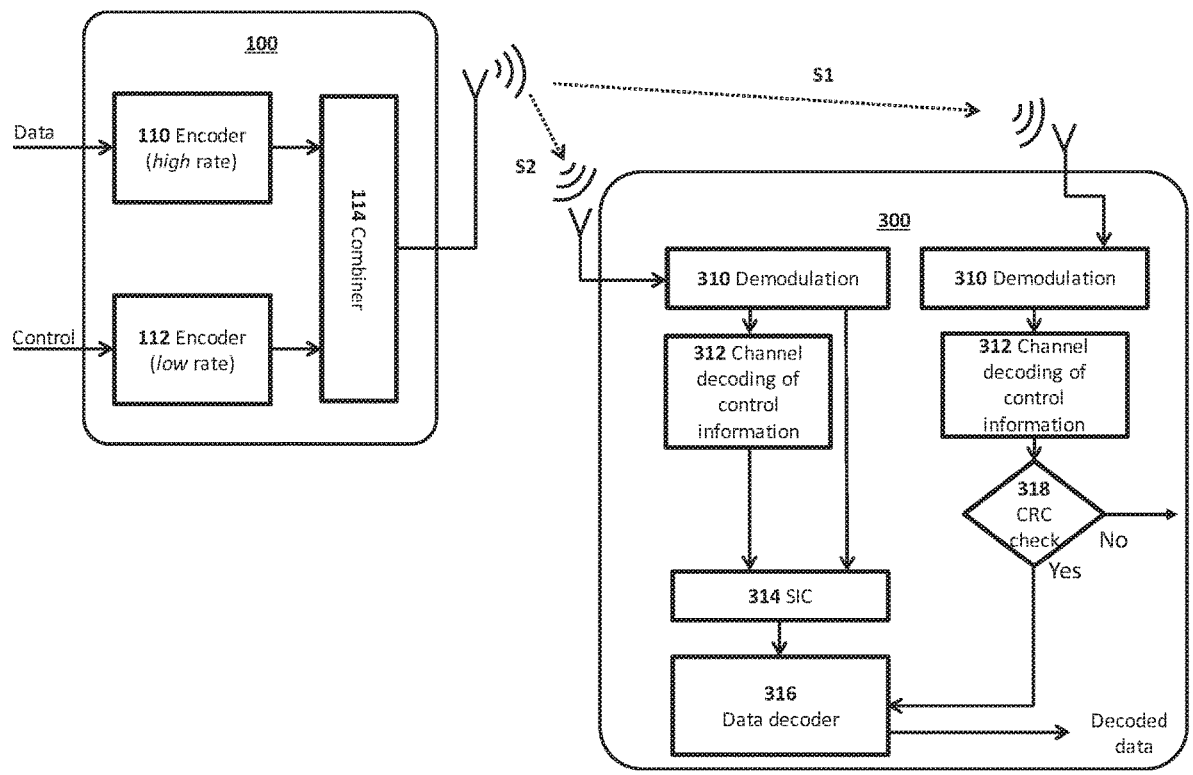
FIG. 8 shows a block diagram of transmitting device and a receiving device.

FIG. 8 shows a block diagram of the transmitting device 100 and receiving device 300 to the superposition cases mentioned in FIGS. 6 and 7 where data information and control information in the same superposed signal are intended for different receiving devices. With reference to FIG. 8, upon reception of the first sequence of superposed symbols S1, the receiving device 300 blindly detects and decodes the control signal addressed to itself. This is performed by demodulation block 310 to demodulate the first superposed signal S1. After that, the channel decoding of control information is performed in the channel decoding block 312 by treating the data signal comprised in the first superposed signal S1 as noise. A CRC check is then performed in the CRC check block 318. If CRC check passes, the control information intended for the receiving device 300 is obtained. The receiving device 300, upon the reception of the second superposed sequence of symbols S2, performs demodulation of the second superposed signal in block 310, then performs channel decoding of control information that is not intended for the device itself in block 312. Indeed, the receiving device 300 does not need to perform complete blind decoding of the control signal which is not intended for this receiving device 300. The receiving device 300 decodes the data signal after cancelling the interference coming from the control signal. The receiving device 300 further performs successive interference cancellation (SIC) in SIC block 314. When SIC is performed, interference of control information is cancelled from the second superposed signal S2. After SIC, the receiving device 300 further decodes the data information at the data decoding block 316. The decoded data message intended for the receiving device 300 is obtained using the control information intended for the same receiving device that was previously blindly decoded. Finally, the receiving device 300 delivers the data to user applications in the receiving device 300 and possibly sends an ACK or NACK message to the transmitting device 100 based on the result of the CRC check performed on data information (this is not shown in the figures).

Generally, when blind decoding of control information is needed, the following steps have to be performed: channel decoding of control information; CRC computation; descrambling of CRC with user RNTI; and checking if CRC passes the condition. In the case shown in FIG. 8, only the first step, i.e., channel decoding of the control information on the second superposed signal S2, is enough to allow cancellation of the superposed control signal. CRC acting as an outer code has the advantage of bringing additional protection to superposed control signal. In this case, not performing CRC decoding can bring degradation to the cancellation quality of the superposed control signal.

Figure 9:
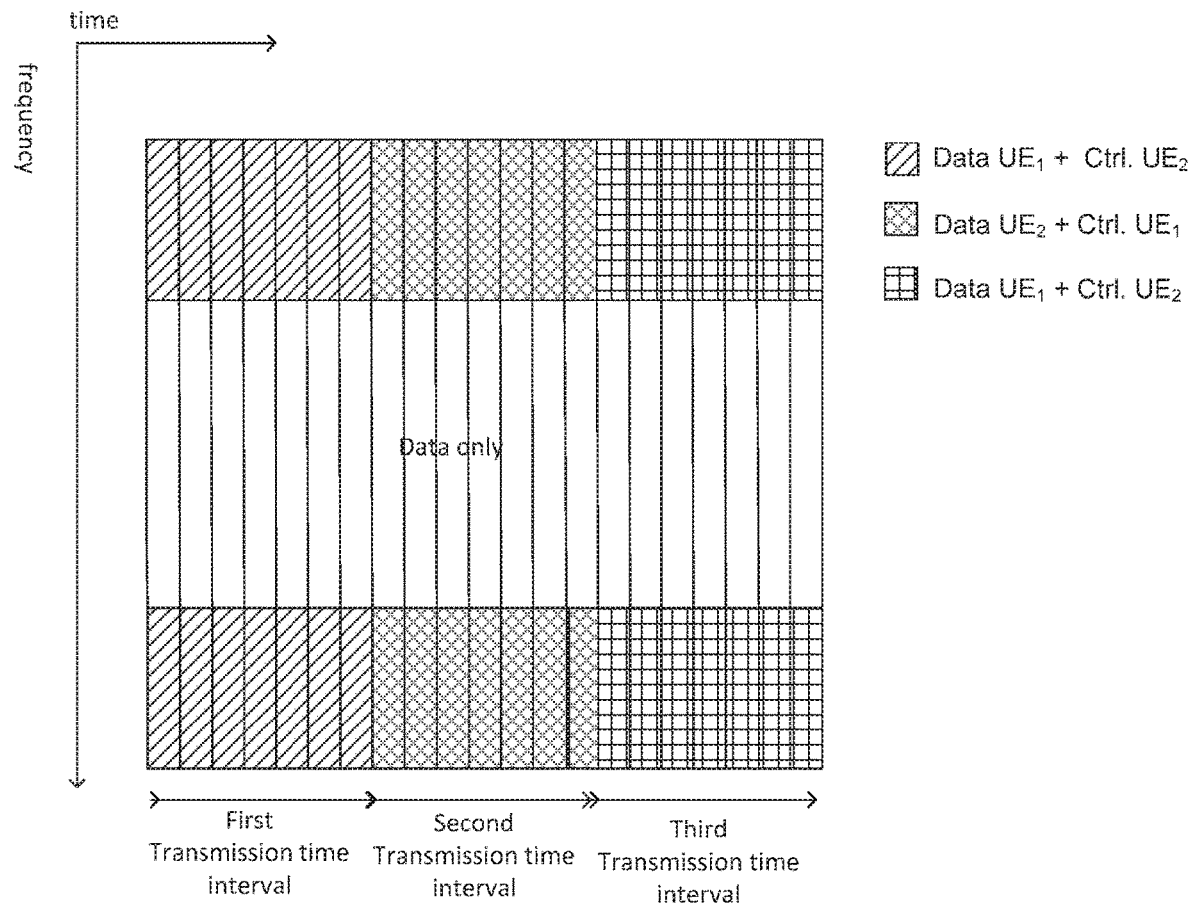
FIG. 9 shows superposition of data information and control information using non-consecutive frequency allocation.

Superposition of data information and control information can also be performed in a frequency distributed manner as shown in the embodiment of FIG. 9. As shown in FIG. 9 several frequency distributed resources have superposed data information and control information as described previously while the remaining resources having only data information possibly intended for other receiving devices. The reason is that the control channel is typically frequency distributed. Having the control channel in frequency distributed manner makes it more robust to channel fading.

In this design, the receiving device 300 does not have a priori knowledge of the composite constellation, i.e., the higher order constellation generated by superposition of two lower order constellations corresponding to control and data constellation. This information could be explicitly signalled to the receiving device 300 in a preamble independently, but it is preferable to keep blind decoding of control channel possible.

In order to make blind decoding of modulation order possible, without explicit information about composite constellation available, we can assume that, for each possible composite constellation configuration, there is a constellation-specific indication that contains the position of bits allocated to control channel in the composite constellation when we transmit a superposed signal. The following table shows an example of such an allocation.

TABLE 1 constellation-specific position for control channel bits.

| Composite constellation | Number of bits in composite constellation | Position of control channel bits |
|---|---|---|
| 16 QAM | 4 | 1, 2 |
| 64 QAM | 6 | 3, 4 |
| 256 QAM | 8 | 5, 6 |

With such an assumption, blind decoding of control information of a receiving device 300 becomes possible. It is assumed in this table that control information is encoded using QPSK and therefore, only two bits are enough to indicate the position of control information. The first column of the table shows the composite constellation resulted from the superposition of data and control information, while the third column shows the position of control information bits.

In order to perform blind decoding, the receiving device 300 makes hypothesis over all possible composite constellation formats and blindly decodes the corresponding control information taking into account the predefined allocation of the position of control information bits corresponding to each hypothesis. This mechanism could be combined with the blind decoding mechanism used in legacy control channel detection mentioned in 3GPP specification 36.213.

The constellation-specific positions used to indicate control channel bits depend on the used overloading scheme. As mentioned earlier, in REMA one has the freedom to assign label bits with different bit-level capacities to control information and data information as exemplified in Table 1.

Figure 10:
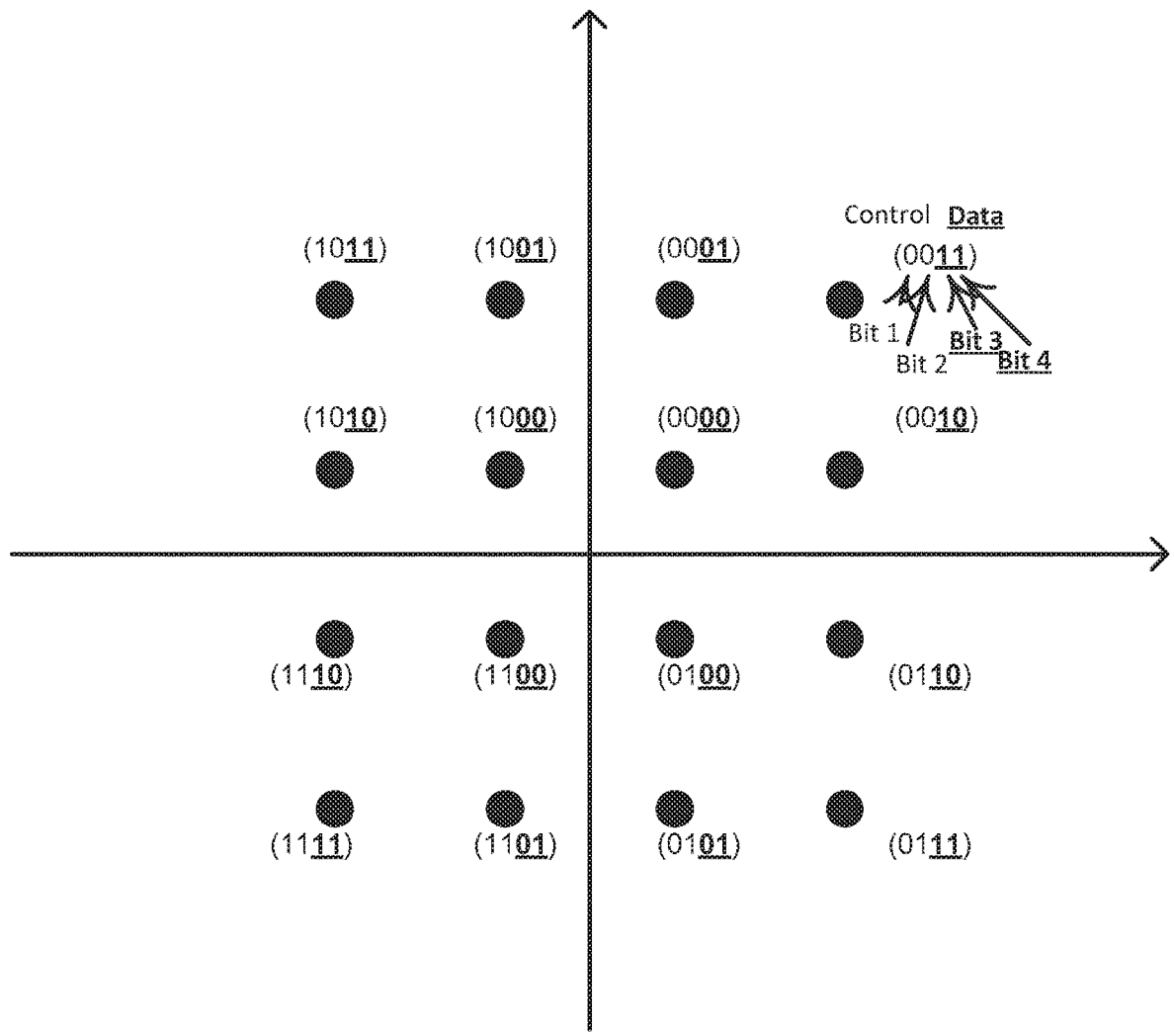
FIG. 10 shows an example of a REMA constellation.

FIG. 10 shows constellation-specific positions used for control channel in the case where the composite constellation is 16 QAM. In this example, bits with higher level capacities are assigned to control information while bits with lower level capacities are assigned to data information.

For NOMA/SOMA, as bits are mapped to the component constellation first, only the last two bits or first two bits of the composite constellation could carry control information (assuming QPSK modulation for control channel).

Figure 11:
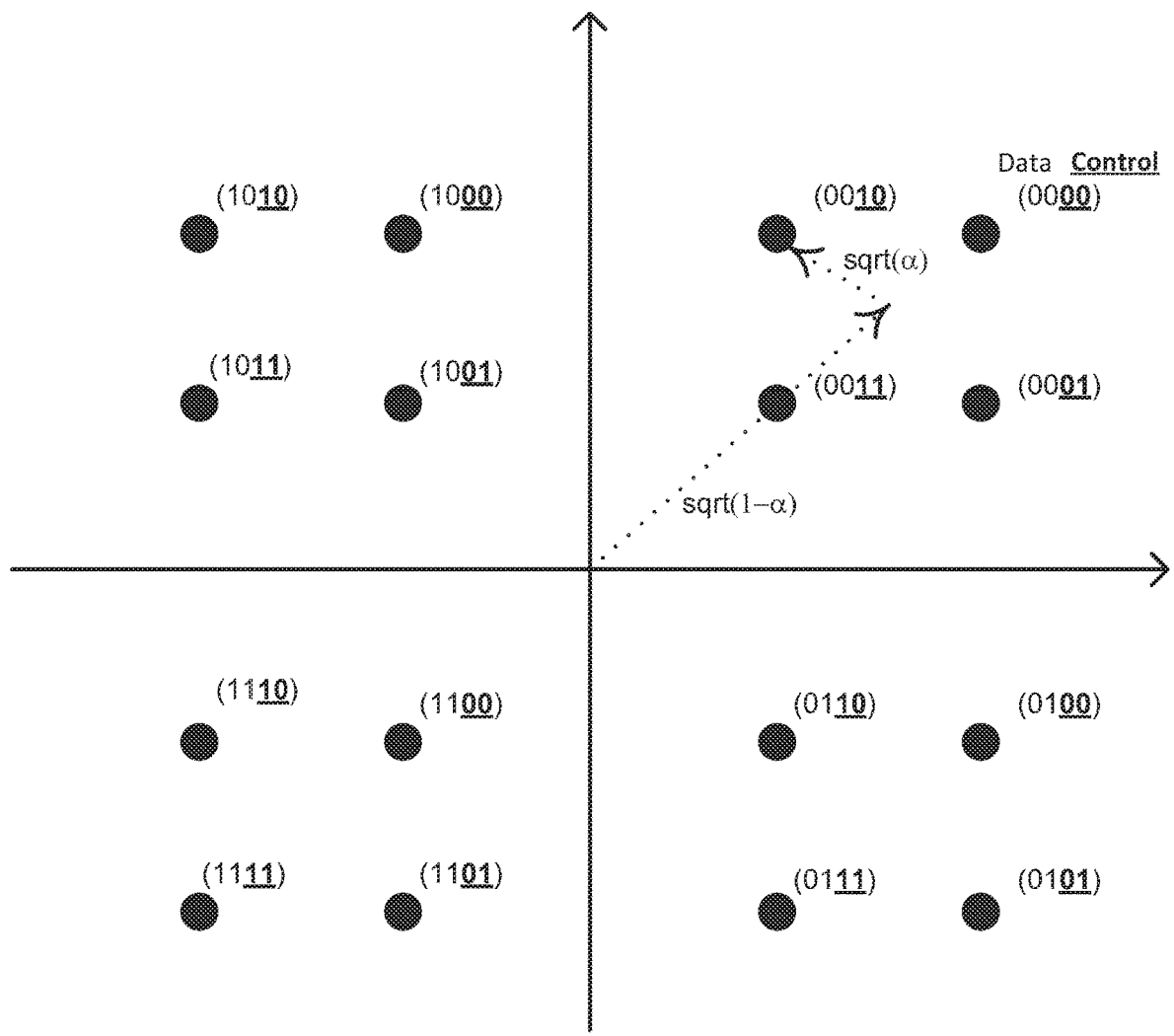
FIG. 11 shows an example of a NOMA superposed constellation.

FIG. 11 shows the case where the constellation specific positions in NOMA dedicated to control channel are two last bits of composite constellation. In this case, the ratio of power allocated to data transmission is a. Indeed, when total transmission power of superposed signal is set to 1, the amplitude corresponding to data signal and control signal are respectively $\sqrt{\alpha}$ and $\sqrt{1-\alpha}$.

Figure 12:
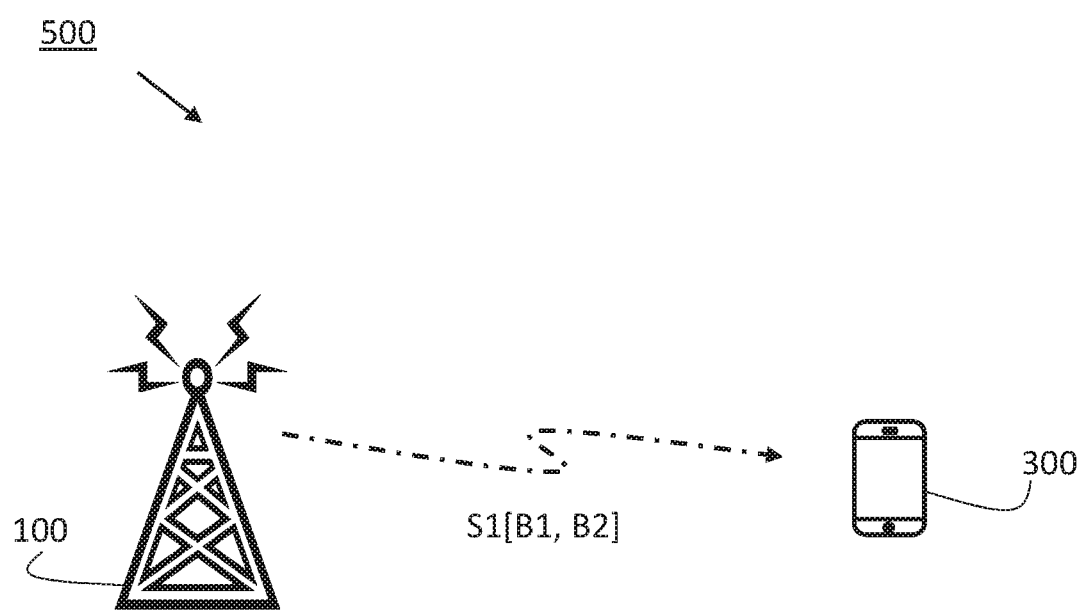
FIG. 12 shows an example when control information and data information are addressed for only one receiving device.

FIG. 12 shows an embodiment of the disclosure in which the present superposition transmissions involves only one receiving device 300. Therefore, the first control information C1 and the first data information D1 are both addressed for a single (first) receiving device 300a. The transmitting device 100 transmits a superposed sequence of symbols S1 to the receiving device 300. The superposed sequence of symbols S1 comprises a first sequence of bits B1 comprising first control information C1 and a second sequence of bits B2 comprising first data information D1. Hence, data information and control information of only one receiving device are superposed and transmitted in one TTI as shown in FIG. 13.

Figure 13:
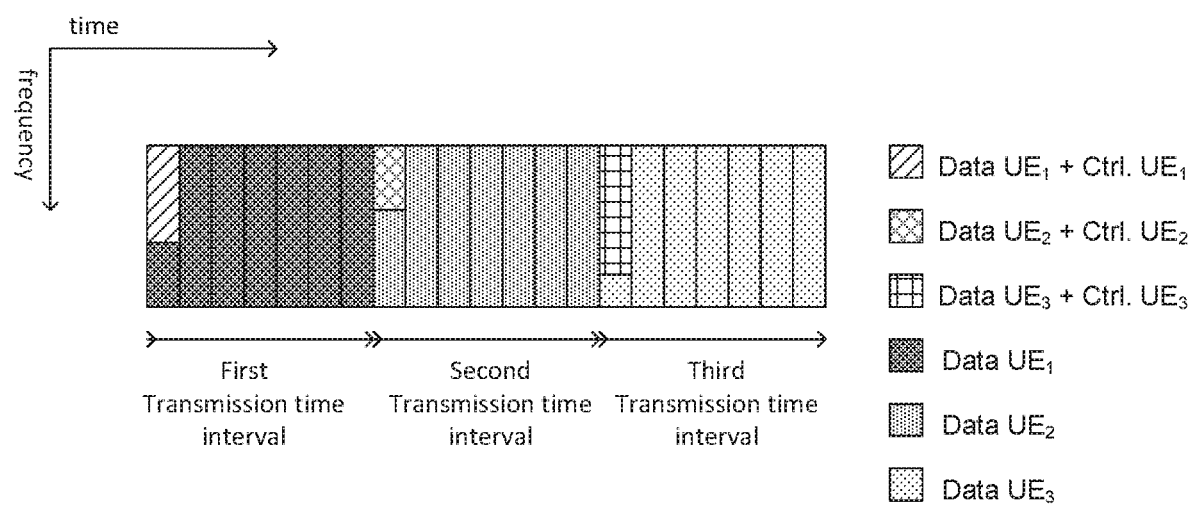
FIG. 13 shows a frame structure when data information and control information of a single receiving device are superposed in one TTI.

In the second TTI of FIG. 13 for the overloaded portion of the second TTI, control information of UE1 is superposed on data information of UE1. Upon the reception of the first superposed signal S1, the receiving device 300 demodulate and decode control information of UE1 from the first superposed signal S1. Data information of UE1 is obtained after data decoding is performed over interference cancelled signal using control information of UE1. It is worth to mention that the decoding of data information of UE1 happens only if the control information of UE1 is successfully blindly decoded in the same TTI. Blind detection of control information comprises of channel decoding of control information of UE1 and passing correctly CRC check of UE1.

Figure 14:
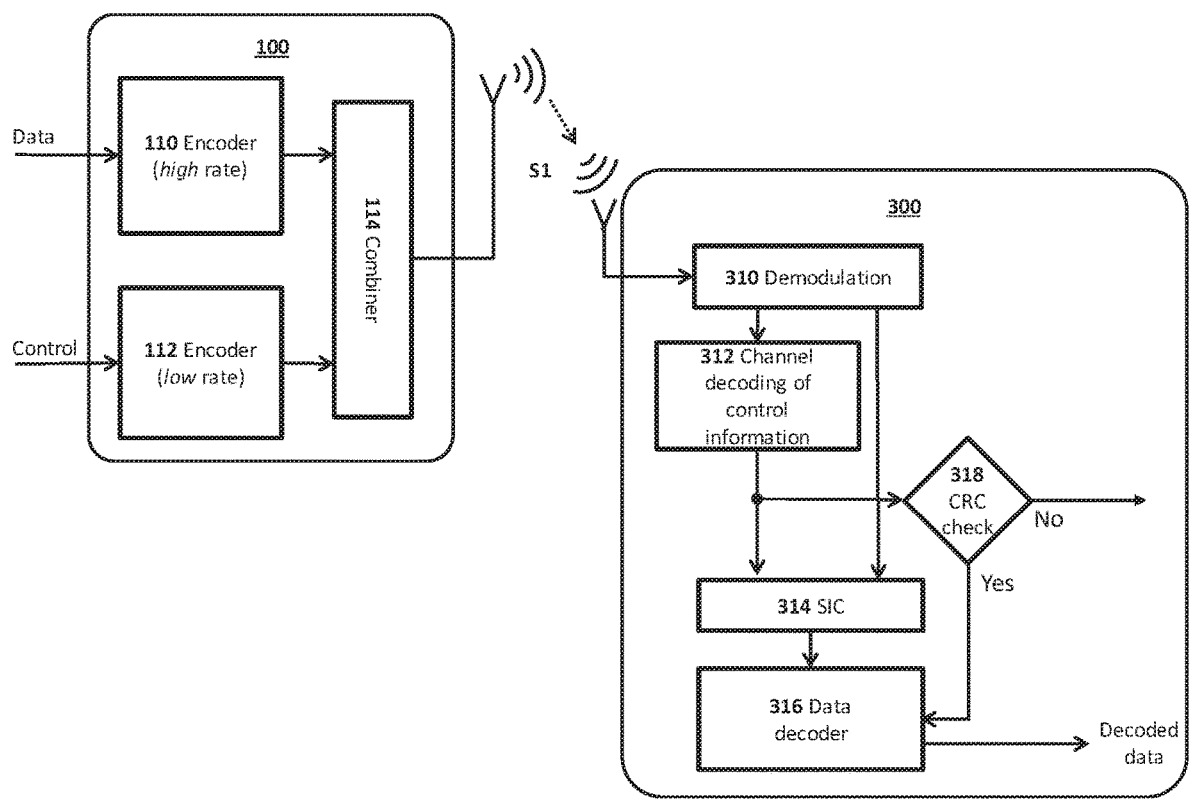
FIG. 14 shows a block diagram of a transmitting device and receiving device.

FIG. 14 shows a block diagram of the transmitting device 100 and the receiving device 300 corresponding to the superposition scheme in FIG. 13. In this case, data information and control information for the same receiving device are superposed. At the receiving device 300, if blind decoding of the control information is successful (i.e. CRC check results is Yes), data information of UE1 can be decoded. Otherwise the whole packet should be retransmitted. In this case, complete blind decoding of control information is performed. Therefore, CRC acting as an outer code brings additional protection and leads to better cancellation of interfering control message.

More in detail and with reference to FIG. 14, the receiving device 300 demodulates the received signal in the demodulation block 310. The receiving device 300 further performs channel decoding of control information based on the demodulated signal in the decoding block 312. The output of the decoding is checked in the CRC check block 318. If the outcome of the CRC block 318 is successful, information related to data characteristics such as modulation order, carrier indicator, new data indicator, etc. are known. This information could be used later to decode data message. Moreover, the receiving device 300 further performs SIC on the output of the channel decoder and the demodulated signal in the SIC block 314. When SIC is performed, interference of control information is cancelled from the superposed signal. After SIC the receiving device 300 further decodes the data information based on the SIC signal at the data decoding block 316 taking into account information obtained about data characteristics if CRC is successful. Finally, the receiving device 300 delivers the data to user application in the receiving device 300 and possibly sends an ACK or NACK message to the transmitting device (this is not shown in the figures).

As was shown in FIG. 13 the control packet is smaller than the data packet, therefore control channel information is mapped only to a part of the TTI instead of whole TTI, while the data packet fills the whole TTI. It is therefore an open issue which modulation order should be used in the portion of transmission time interval where control and data are overloaded and which modulation order should be used in the part of TTI where there is only data transmission. Several solutions could be distinguished:

In a first solution, in the data portion of the TTI data is transmitted with the modulation order that is determined based on the link quality feedback. In the overloaded portion, the same modulation order is used for the composite constellation. Control channel is transmitted with a fixed modulation order, i.e., QPSK, while data is transmitted with lower modulation order compared to the portion of transmission time interval where there is no overloading. For example, if the data modulation order determined based on link quality feedback is $\omega_{D1}=4$ (16 QAM), then in the portion of TTI where only data is transmitted we use 16QAM while, in the overloaded portion of sub-frame, control transmission will use $\omega_C=2$ (QPSK) and data transmission will use $\omega_{D2}=2$ (QPSK) as well. In the receiver side, as overloading involves only one user in the case shown in FIG. 13, the region dedicated to control channel becomes implicitly known after blind decoding of control information (see FIG. 13). Therefore, two different data modulation orders can be received without additional signalling. The advantage of this case is that the data transmission can take full benefit of link quality that is fed back to the transmitting device 100.

In a second solution, the data modulation order is the same in the whole TTI. It implies that, in the portion of TTI with overloading, transmission is performed using the composite modulation order that is determined by link quality feedback for data transmission. This composite modulation order accounts for data information and control information. In the remaining part of the TTI data will be transmitted using the same modulation order as in the overloaded portion, even though this modulation order is not the one determined by link quality feedback. For example, if link quality feedback recommends using a modulation order $\omega=16$ (64QAM), in the overloaded portion of the TTI, QPSK is used for control channel transmission in the overloaded portion, and 16 QAM is used for data transmission, thus the composite modulation has 64 symbols. 16QAM is also used for data transmission in the rest of the sub-frame.

In MIMO scenarios control transmission and data transmission can use the same or different precoding/beamforming vectors depending on the overloading scheme that is used. In the case of REMA and RA-CEMA as superposition is performed in the codeword domain, i.e. on coded bits, the same precoding/beamforming vector should be used for control information and data information. This can be achieved by co-scheduling control transmission and data transmission that require the same precoding/beamforming vector. If the same precoding/beamforming vector is used, detection and interference cancellation is performed as explained before. In the case of NOMA and SOMA, different precoding/beamforming vector could be potentially used for data transmission and control transmission as NOMA and SOMA allow using different precoder/beamforming vectors for the co-scheduled receiving devices. In this case, if the control information of one UE1 and the data information of another UE2 are superposed, it is possible that, in the receiving device of UE2, the received SNR for the control information (control information intended for UE1) is low, but the received SNR for the data information is high. In this case, it is possible to decode the data that is intended for UE2 without detecting the control signal (that is not intended for UE2).

Figure 15:
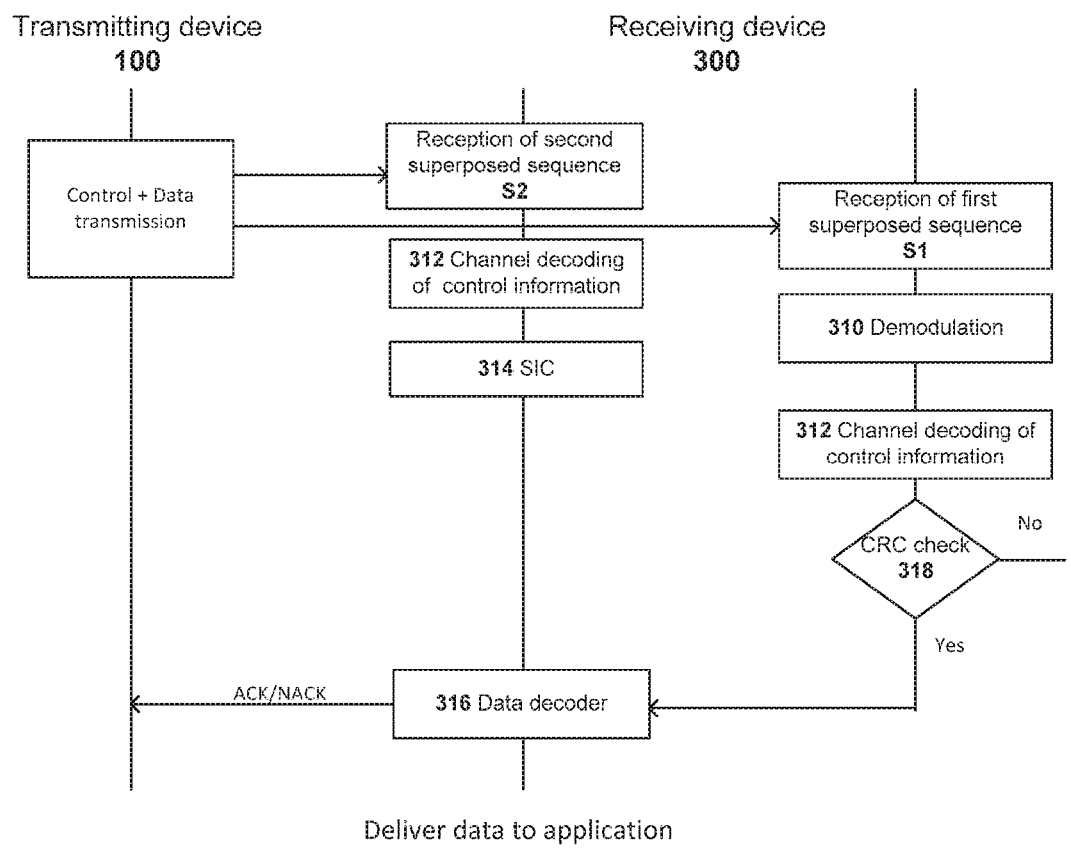
FIG. 15 shows signalling and processing according to an embodiment of the disclosure.

The procedure corresponding to FIG. 8 is shown in FIG. 15. This scheme shows transmission and reception described previously in FIG. 8 and FIG. 15, respectively. Additionally, it captures the transmission of ACK/NACK messages (the signal that acknowledges the correct/incorrect reception of data message) to the transmitting device 100.

Figure 16:
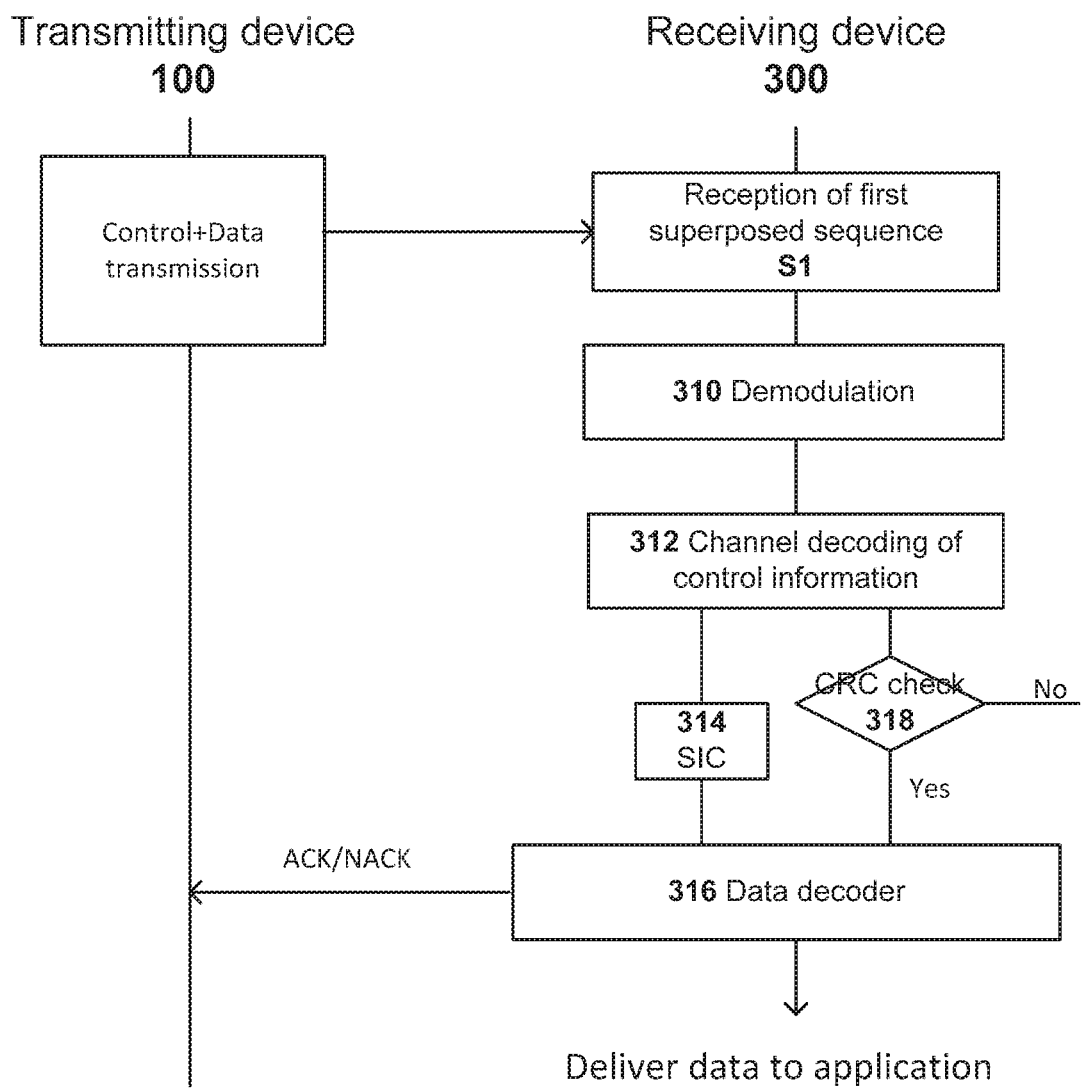
FIG. 16 shows signalling and processing according to an embodiment of the disclosure.

The procedure corresponding to FIG. 14 is described in FIG. 16. This schemes shows transmission and reception described in FIG. 14 and FIG. 16, respectively. Transmission of ACK/NACK messages to the transmitting device 100 after correct/incorrect reception of data by receiving device 300.

Moreover, the solutions shown in FIGS. 7 and 8 are evaluated using a simple link-level simulator in a LTE system. Channel codes and rate matching blocks corresponding to control information and data information (i.e., convolutional code and turbo code) are implemented as per description in LTE system. We did not append CRC to information bits. In the case of control channel detection, we assume that the UE knows on which resource element to start blind decoding and on which resource element to finish the decoding. We have also assumed that the UEs have the knowledge of composite constellation.

As mentioned previously, in link-level simulation, when superposition is simulated, we have considered the case where only two users. i.e. user1 and user2 are present and have the same received SNRs as in FIG. 7 (user1 and user2 can e.g. be UEs). More precisely, we assume that in the first TTI user1 sends a data signal that is superposed to control channel of user2 on the same TTI. Correct detection of data of user1 in this TTI is subject to the correct detection of control channel of the same user in the previous TTI. The operation is repeated in the next TTI by inverting the role of users. In TTI no. 2 the user that was sending data will send control and vice versa. It is also assumed that the user that sends control information has a lower rate compared to the user that sends data. The reference scenario is considered to be the case where data and control of one user is sent over consecutive TTIs and therefore are orthogonally transmitted. The following tables summarize more details on simulation scenarios.

TABLE 2

Details of simulation related to superposed scenario

| Parameter | Value |
| --- | --- |
| Info. Bits (control) | 100 |
| Info. Bits (data) | 216 |
| Number of resource elements | 240 |
| Number of symbols in control channel constellation | 4 |
| Number of symbols in data channel constellation | 16 |

TABLE 3

Details of simulation related to reference case.

| Parameter | Value |
| --- | --- |
| Info. Bits (control) [$N_{PDCCH}$] | 100 |
| Info. Bits (data) [$N_{PDSCH}$] | 216 |
| Number of symbols in control channel constellation [$2^{M_{PDCCH}}$] | 4 |
| Number of symbols in data channel constellation [$2^{M_{PDSCH}}$] | 16 |
| Number of resource elements [$RE_{PDSCH} = RE_{PDCCH}$] | 240 |

The selected superposition scheme is chosen to be REMA. It is known that, with REMA, one can easily assign label bits with different capacities in the composite constellation to different UE codewords and achieve the same effect as allocating different power levels to different users as in other overloading schemes. Typically, in this scheme, label bits with higher capacities are assigned to the UE with a lower SNR (i.e., the user that sends control channel information).

In order to have detailed insight into the behaviour and performance of this proposal, we didn't limit ourselves to the typical case where label bits with higher capacities are assigned to the control codeword. Indeed, we have also considered the case where the bits with mid-level capacity or bits with low-level capacity are allocated to the control codeword. Intuitively, these cases would guarantee better performance for data detection if corresponding control detection is successful.

In the simulations we have studied the block error rate (BLER) for PDSCH when superposition is performed and we have compared the results with the BLER of PDSCH to the reference scenario where the control and data transmission are orthogonal.

As a design choice we select to have the total energy considering control and data transmission being the same for both superposition scenario according to the present solution and LTE scenario and we set as the x-axis of performance curves Eb/N0 in dB. With this assumption the amplitude of superposed constellation symbol is equal to:

$$A_{SCC} = \sqrt{\frac{E_{b\text{-}eff}}{E_{b\text{-}PDSCH}}} = \sqrt{1 + \frac{E_{PDCCH}}{E_{PDSCH}}} \tag{1}$$

with:

$$E_{PDCCH} = E_{b\_PDCCH} \times N_{PDCCH}$$
$$E_{PDSCH} = E_{b\_PDSCH} \times N_{PDSCH}$$

and $$E_{b\_eff} = \frac{(E_{PDSCH} + E_{PDCCH})}{N_{PDSCH}} \tag{2}$$

In the above equations, $A_{SCC}$ denotes the amplitude of superposed constellation, $E_{b\_PDSCH}$ denotes energy per bit of PDSCH. $N_{PDSCH}$ denotes the number of PDSCH information bits. $E_{PDSCH}$ and $E_{PDCCH}$ denotes energy of PDSCH and energy of PDCCH in the considered TTI. Here, we assume that LTE constellation symbol has amplitude 1.

In order to obtain the above equations, we assumed implicitly the following:
A) Total energy for transmission of PDSCH and PDCCH is the same for both LTE and superposed control channel transmission.
B) The number of resource elements for the PDSCH in superposed transmission is the same as in LTE PDSCH conveying the same number of information bits.
C) The coding scheme for PDSCH in superposed scheme is the same as in LTE PDSCH conveying the same number of information bits.
D) Energy per bit of PDSCH in superposed scheme is the same as energy per bit of PDSCH in LTE.

From B), C) and D) it follows:
E) $E_{PDSCH}$ is the same for all schemes.

From A) and E) it follows:
F) $E_{PDCCH}$ is the same for all schemes.

Different simulated cases, denoted as CASE 1, CASE 2 and CASE 3, are described in the following disclosure with reference to FIGS. 17 to 21 in which the x-axis shows SNR in dB and the y-axis shows BLER or spectral efficiency (SE).

Figure 17:
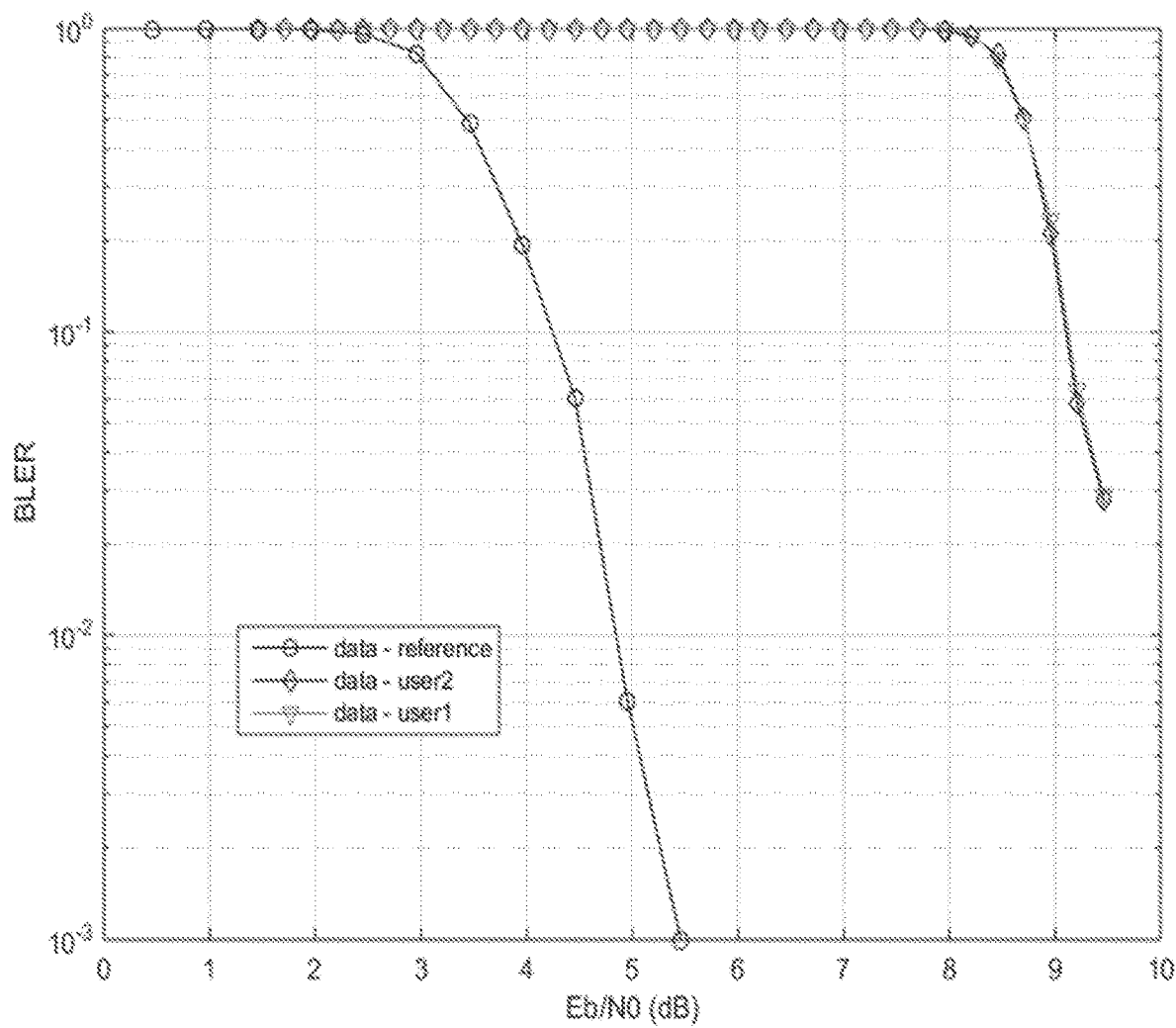
FIG. 17 shows performance results for embodiments of the disclosure.

CASE 1: As suggested in the original implementation of REMA, we allocate label bits with higher bit level capacities to the control transmission. In this case, we have allocated to the control channel the label bits with highest bit level capacity. Consequently, label bits with lower bit level capacities are allocated to the data transmission. FIG. 17 shows the simulation results based on such a setting. For the ease of understanding, we have plotted the block error probability for data detection (marked with triangle for user 1 and marked with diamond for user 2) of each user. In this specific case, we observed that the control information of superposed users is decoded with a very small error probability that is invisible on the curves. This is due to the fact that label bits with the highest bit level capacities are allocated to the control transmission and thus the control channel is a strong channel (i.e., stronger than the data channel). Therefore, control transmission does not fail often for higher SNRs. Contrarily to the control, label bits allocated to data are the bits with lowest bit level capacities. Therefore, data codewords use a weaker channel and thus data transmission fails very often. As a result, we can see a large gap between detection of data for reference case (shown with circles) and overloaded case (triangle and diamond).

Figure 18:
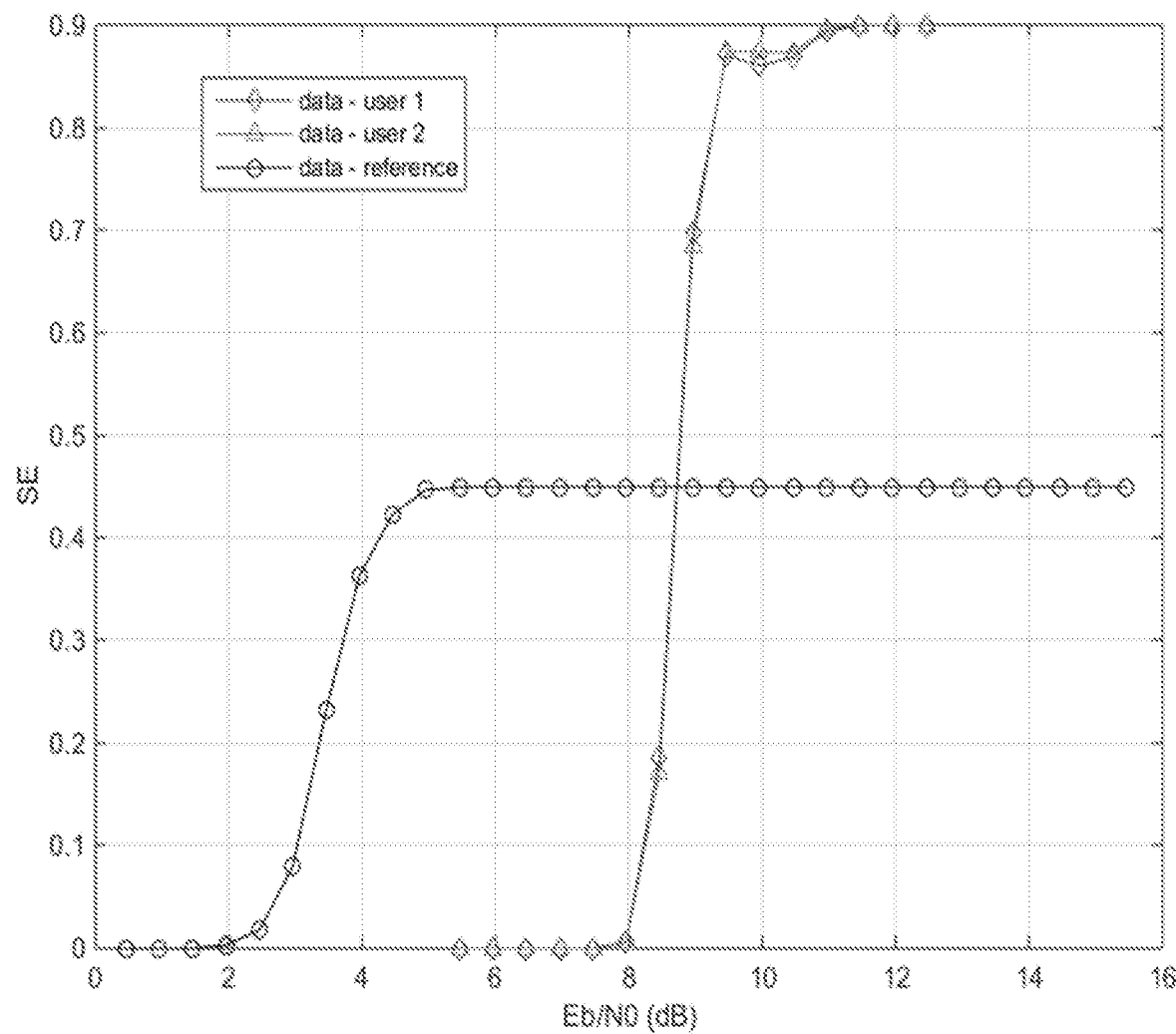
FIG. 18 shows spectral efficiency.

FIG. 18 shows the spectral efficiency on the Y-axis of overloaded data and control channel compared to the reference case. The spectral efficiency of the overloaded channel is obtained as:

$$SE = (P_c \cdot N_{PDSCH})/RE_{PDSCH} \tag{3}$$

with $P_c = (1-\text{BLER})$ being the probability of the correct reception of PDSCH block. It is worth to mention that correct reception of PDSCH block implies correct reception of the corresponding PDCCH block. $N_{PDSCH}$ denotes the number of data information bits and $RE_{PDSCH}$ is the number of used resource elements to transmit the signal.

For the reference case the definition of SE is somewhat different, as it takes into account all the resource elements used for data and control:

$$SE_{ref} = (P_c \cdot N_{PDSCH})/(RE_{PDSCH} + RE_{PDCCH}) \tag{4}$$

We can observe from FIG. 18 that the spectral efficiency for superposed control and data transmission in this case is doubled as that of the reference case, where data and control are transmitted in consecutive TTIs, i.e., they are time multiplexed.

CASE 2: In this case, we trade off the performance of control transmission with data transmission by allocating two mid-capacity label bits of 64QAM (resulting composite constellation) to control channel and the rest to data. As expected, in this situation the channel experienced for data becomes stronger compared to the CASE1 and the performance for data detection is considerably improved. On the other hand, the performance of control channel is worse compared to CASE1 as the experienced channel becomes weaker.

Figure 19:
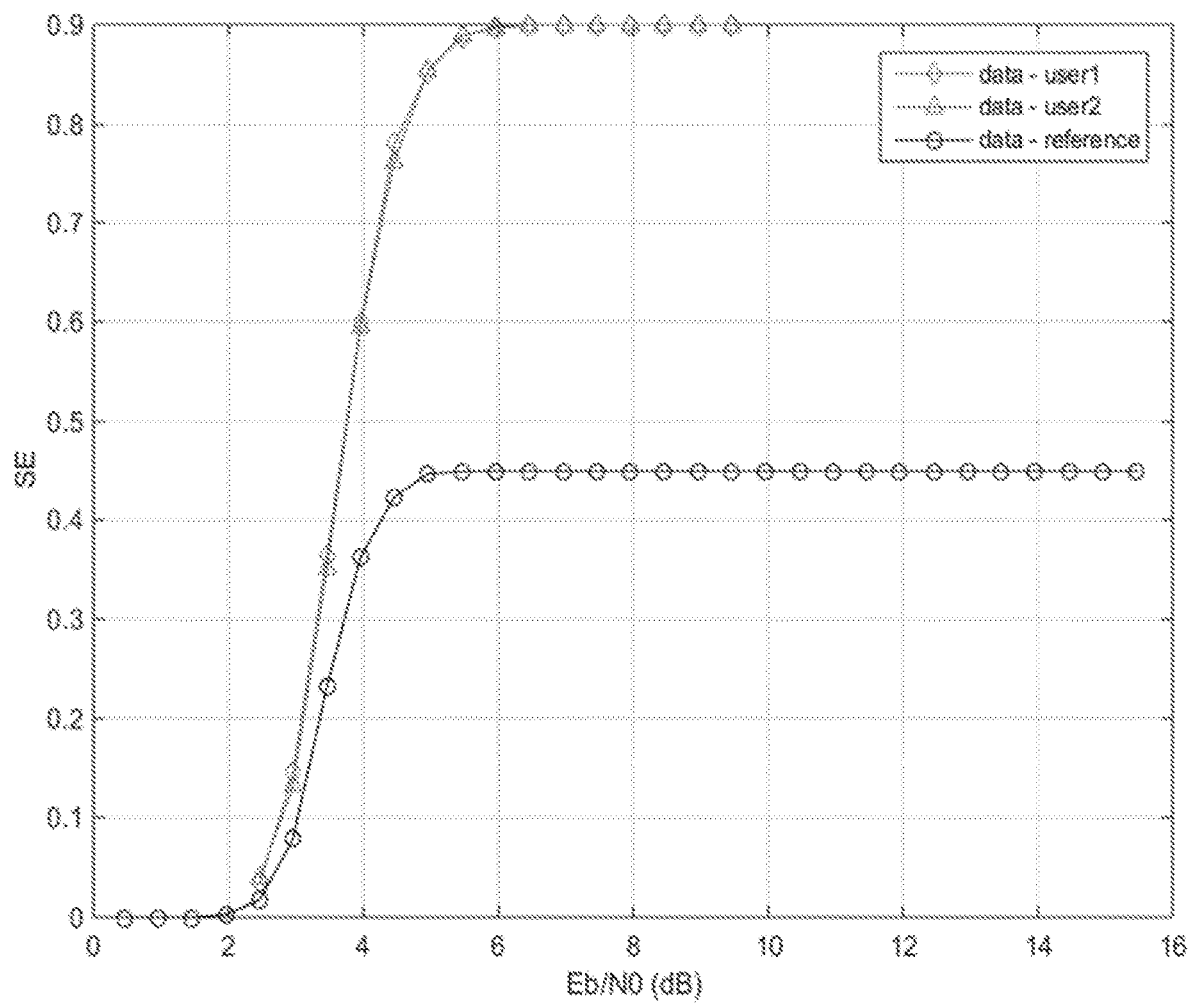
FIG. 19 shows performance results for embodiments of the disclosure.

As a result, the gap for overloaded case compared to the orthogonal transmission is reduced to 0.56 dB for BLER of 10% in this case which corresponds 90% asymptotic spectral efficiency reported in FIG. 19. It is interesting to mention that this case with REMA has no equivalence in NOMA/SOMA.

Figure 20:
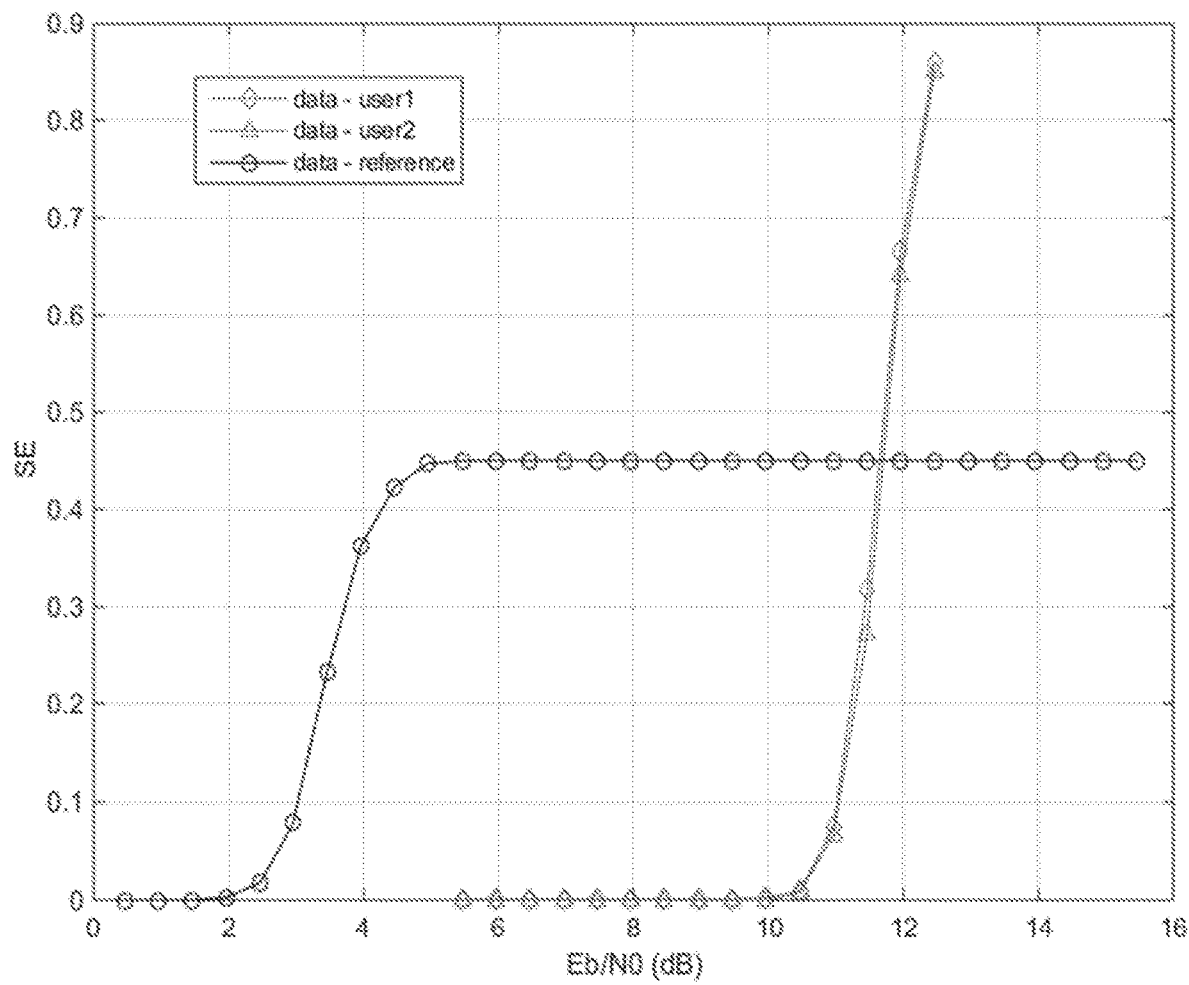
FIG. 20 shows performance results for embodiments of the disclosure.

CASE 3: In this case two low-capacity label bits of 64QAM are allocated to control channel and the rest to data. FIG. 20 shows simulation results based in this allocation. As expected, control transmission experiences a very weak channel. With control channel failing very often, data detection is very seldom successful. This shows therefore a very big gap for the data detection in the case of overloading compared to the reference case (almost 6 dB for spectral efficiency of 0.4 bit/sec/Hz).

Figure 21:
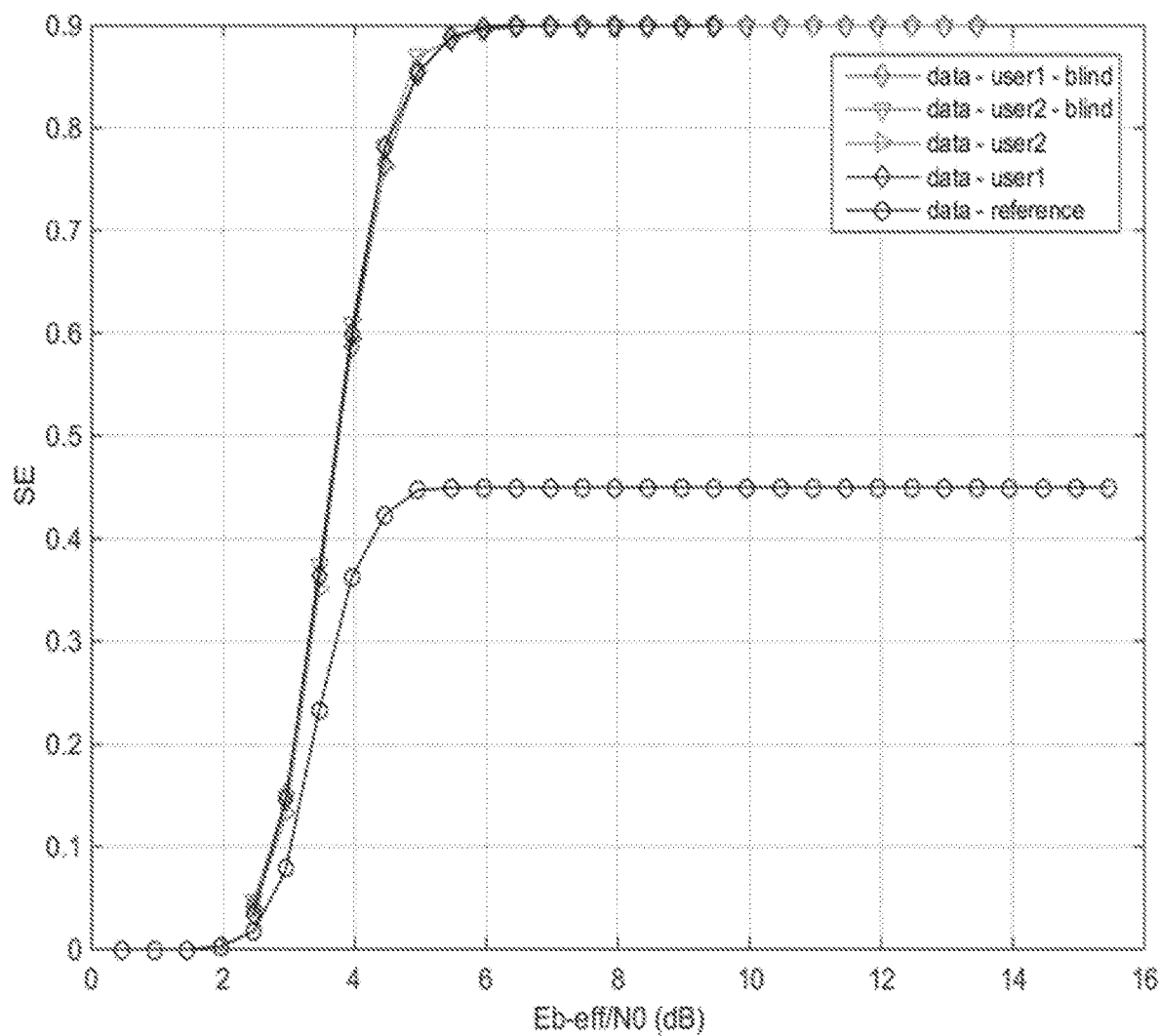
FIG. 21 shows blind decoding of modulation order without explicit information of composite constellation modulation order.

FIG. 21 shows the performance results when the user has to decode blindly the composite constellation over all possible hypothesis mentioned in Table 3 using CASE2. We can see that in this case, there is no loss when blind decoding is used.

Furthermore, any method according to the embodiments of the present invention may be implemented in a computer program, having code means, which when run by processing means causes the processing means to execute the steps of the method. The computer program is included in a computer readable medium of a computer program product. The computer readable medium may comprise of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present transmitting device 100 and the receiving device 300 comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors 102 and 304 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

According to another embodiment, a wireless communication system comprising a transmitting device and at least one receiving device according to any of the preceding embodiments.

According to another embodiment, a method for a transmitting device, the method comprising:
obtaining a first sequence of bits comprising first control information addressed for at least one receiving device;
obtaining a second sequence of bits comprising first data information addressed for the at least one receiving device;
superposing the first sequence of bits and the second sequence of bits into a first superposed sequence of symbols;
transmitting the first superposed sequence of symbols to the at least one receiving device in a radio resource.

According to another embodiment, a method for a receiving device, the method comprising:
receiving a first superposed sequence of symbols comprising: a first sequence of bits comprising first control information and a second sequence of bits comprising first data information;
decoding the first superposed sequence of symbols so as to obtain the first sequence of bits, wherein the first sequence of bits comprises the first control information.

According to another embodiment a non-transitory computer readable medium with program code for performing a method on a transmitting device, the method comprising:
obtaining a first sequence of bits comprising first control information addressed for at least one receiving device;
obtaining a second sequence of bits comprising first data information addressed for the at least one receiving device;
superposing the first sequence of bits and the second sequence of bits into a first superposed sequence of symbols; and
transmitting the first superposed sequence of symbols to the at least one receiving device in a radio resource.

Finally, it should be understood that the disclosure is not limited to the embodiments described above, but also relates to and incorporates all embodiments within the scope of the appended independent claims.

What is claimed is:

1. A transmitting device for a wireless communication system, the transmitting device comprising:
a processor; and
a non-transitory computer-readable medium storing instructions, that when executed by the processor, cause the transmitting device to perform steps comprising:
obtaining a first sequence of bits comprising first control information addressed for at least one receiving device;
obtaining a second sequence of bits comprising first data information addressed for the at least one receiving device;
superposing the first sequence of bits and the second sequence of bits into a first superposed sequence of symbols;
obtaining a third sequence of bits comprising second control information;
obtaining a fourth sequence of bits comprising second data information;
superposing the third sequence of bits and the fourth sequence of bits into a second superposed sequence of symbols; and
transmitting the first superposed sequence of symbols and the second superposed sequence of symbols to the at least one receiving device in a radio resource, wherein the receiving device cancels interference in the second superposed sequence of symbols based on the third sequence of bits to obtain a second interference cancelled superposed sequence of symbols, and decodes the second interference cancelled superposed sequence of symbols based on the first control information so as to obtain the fourth sequence of bits comprising the second data information.

2. The transmitting device according to claim 1, wherein the transmitting step further comprises:
transmitting the first superposed sequence of symbols in the beginning of a transmission time interval of the radio resource.

3. The transmitting device according to claim 1, wherein the at least one receiving device comprises a first receiving device and the first control information and the first data information are addressed for the first receiving device.

4. The transmitting device according to claim 1, wherein the at least one receiving device comprises a first receiving device and a second receiving device and the first control information is addressed for the first receiving device and the first data information is addressed for the second receiving device.

5. The transmitting device according to claim 1, wherein the superposing step further comprises:
superposing the first sequence of bits and the second sequence of bits into the first superposed sequence of symbols based on rate-adaptive constellation expansion multiple access, wherein at least one bit assigned for the first sequence of bits has a higher bit level capacity compared to at least one bit assigned for the second sequence of bits.

6. The transmitting device according to claim 1, wherein the superposing step further comprises:
    superposing the first sequence of bits and the second sequence of bits into the first superposed sequence of symbols based on a non-orthogonal multiple access, NOMA, wherein the most significant bits in a plurality of labels of the composite constellation of the NOMA are assigned for the first sequence of bits.

7. The transmitting device according to claim 1, wherein a code rate for the first sequence of bits is lower than a code rate for the second sequence of bits.

8. A receiving device for a wireless communication system, the receiving device comprising:
    a processor; and
    a non-transitory computer-readable medium storing instructions, that when executed by the processor, cause the receiving device to perform steps comprising:
    receiving a first superposed sequence of symbols comprising: a first sequence of bits comprising first control information and a second sequence of bits comprising first data information;
    decoding the first superposed sequence of symbols to obtain the first sequence of bits, wherein the first sequence of bits comprises the first control information;
    receiving a second superposed sequence of symbols from the transmitting device, the second superposed sequence of symbols comprising a third sequence of bits comprising second control information and a fourth sequence of bits comprising second data information;
    cancelling interference in the second superposed sequence of symbols based on the third sequence of bits to obtain a second interference cancelled superposed sequence of symbols; and
    decoding the second interference cancelled superposed sequence of symbols based on the first control information so as to obtain the fourth sequence of bits comprising the second data information.

9. The receiving device according to claim 8, wherein the steps further comprise:
    cancelling interference in the first superposed sequence of symbols based on the first sequence of bits so as to obtain a first interference cancelled superposed sequence of symbols; and
    decoding the first interference cancelled superposed sequence of symbols based on the first control information to obtain the second sequence of bits comprising the first data information.

10. A method for a transmitting device, the method comprising:
    obtaining, by the transmitting device, a first sequence of bits comprising first control information addressed for at least one receiving device;
    obtaining, by the transmitting device, a second sequence of bits comprising first data information addressed for the at least one receiving device;
    superposing, by the transmitting device, the first sequence of bits and the second sequence of bits into a first superposed sequence of symbols;
    obtaining, by the transmitting device, a third sequence of bits comprising second control information;
    obtaining, by the transmitting device, a fourth sequence of bits comprising second data information;
    superposing, by the transmitting device, the third sequence of bits and the fourth sequence of bits into a second superposed sequence of symbols; and
    transmitting, by the transmitting device, the first superposed sequence of symbols to the at least one receiving device in a radio resource, wherein the receiving device cancels interference in the second superposed sequence of symbols based on the third sequence of bits to obtain a second interference cancelled superposed sequence of symbols, and decodes the second interference cancelled superposed sequence of symbols based on the first control information so as to obtain the fourth sequence of bits comprising the second data information.

11. A method for a receiving device, the method comprising:
    receiving, by the receiving device, a first superposed sequence of symbols comprising: a first sequence of bits comprising first control information and a second sequence of bits comprising first data information;
    decoding, by the receiving device, the first superposed sequence of symbols so as to obtain the first sequence of bits, wherein the first sequence of bits comprises the first control information;
    receiving, by the receiving device, a second superposed sequence of symbols from the transmitting device, the second superposed sequence of symbols comprising a third sequence of bits comprising second control information and a fourth sequence of bits comprising second data information;
    cancelling, by the receiving device, interference in the second superposed sequence of symbols based on the third sequence of bits to obtain a second interference cancelled superposed sequence of symbols; and
    decoding, by the receiving device, the second interference cancelled superposed sequence of symbols based on the first control information so as to obtain the fourth sequence of bits comprising the second data information.

12. A non-transitory computer readable medium with program code that when executed by a processor causes a transmitting device to perform a method, the method comprising:
    obtaining a first sequence of bits comprising first control information addressed for at least one receiving device;
    obtaining a second sequence of bits comprising first data information addressed for the at least one receiving device;
    superposing the first sequence of bits and the second sequence of bits into a first superposed sequence of symbols;
    obtaining a third sequence of bits comprising second control information;
    obtaining a fourth sequence of bits comprising second data information;
    superposing the third sequence of bits and the fourth sequence of bits into a second superposed sequence of symbols; and
    transmitting the first superposed sequence of symbols to the at least one receiving device in a radio resource, wherein the receiving device cancels interference in the second superposed sequence of symbols based on the third sequence of bits to obtain a second interference cancelled superposed sequence of symbols, and decodes the second interference cancelled superposed sequence of symbols based on the first control information so as to obtain the fourth sequence of bits comprising the second data information.

* * * * *